(12) United States Patent
Radhakrishnan et al.

(10) Patent No.: US 11,762,703 B2
(45) Date of Patent: *Sep. 19, 2023

(54) MULTI-REGION REQUEST-DRIVEN CODE EXECUTION SYSTEM

(71) Applicant: Amazon Technologies, Inc., Seattle, WA (US)

(72) Inventors: Manigandan Radhakrishnan, Seattle, WA (US); Marc John Brooker, Seattle, WA (US); Yilmaz Can Cecen, Seattle, WA (US); David Alexander Dunlap, Seattle, WA (US); Craig Wesley Howard, Seattle, WA (US); Shubham Katiyar, Seattle, WA (US); Ajay Nair, Seattle, WA (US); Venkatesh Vijayaraghavan, Redmond, WA (US); Vo Vuong, Bellevue, WA (US); Meenakshi Vembusubramanian, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 289 days.

This patent is subject to a terminal disclaimer.

(21) Appl. No.: 17/081,756

(22) Filed: Oct. 27, 2020

(65) Prior Publication Data

US 2021/0042163 A1 Feb. 11, 2021

Related U.S. Application Data

(63) Continuation of application No. 15/391,673, filed on Dec. 27, 2016, now Pat. No. 10,831,549.

(51) Int. Cl.
*G06F 9/50* (2006.01)

(52) U.S. Cl.
CPC ...... *G06F 9/5044* (2013.01); *G06F 2209/549* (2013.01)

(58) Field of Classification Search
None
See application file for complete search history.

(56) References Cited

U.S. PATENT DOCUMENTS

| 1,075,551 A | 10/1913 | D'Amours |
| 5,063,500 A | 11/1991 | Shorter |

(Continued)

FOREIGN PATENT DOCUMENTS

| CA | 2741 895 A1 | 5/2010 |
| CA | 2765397 A1 | 2/2011 |

(Continued)

OTHER PUBLICATIONS

Office Action in Chinese Application No. 201810426428.0 dated Jul. 20, 2020 in 25 pages.

(Continued)

*Primary Examiner* — Adam Lee
(74) *Attorney, Agent, or Firm* — Knobbe Martens Olson & Bear LLP

(57) ABSTRACT

An on-demand code execution environment present in points of presence (POPs) and in regions serviced by the POPs is provided herein. For example, a POP may receive a request to execute a task associated with user-defined code. If the POP determines that the computing resources necessary to execute a received task are not available or that the POP should not execute the received task for another reason (e.g., the task is not commonly received and the computing resources needed to execute the task are therefore best allocated for other requests), the POP can forward the task to a region that the POP services for execution by an on-demand code execution environment present in the (Continued)

region. The on-demand code execution environment present in the region can execute the task and forward the results of the execution to the POP for distribution back to a user device that requested the task execution.

20 Claims, 8 Drawing Sheets

(56) References Cited

U.S. PATENT DOCUMENTS

| | | |
|---|---|---|
| 5,341,477 A | 8/1994 | Pitkin et al. |
| 5,459,837 A | 10/1995 | Caccavale |
| 5,611,049 A | 3/1997 | Pitts |
| 5,627,889 A | 3/1997 | Eslambolchi |
| 5,701,467 A | 9/1997 | Freeston |
| 5,764,910 A | 6/1998 | Shachar |
| 5,774,660 A | 6/1998 | Brendel et al. |
| 5,815,649 A | 9/1998 | Utter et al. |
| 5,852,717 A | 11/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 4/1999 | Russell et al. |
| 5,933,811 A | 5/1999 | Angles et al. |
| 5,937,427 A | 8/1999 | Shinagawa et al. |
| 5,974,454 A | 8/1999 | Apfel et al. |
| 5,991,306 A | 10/1999 | Burns et al. |
| 5,991,809 A * | 11/1999 | Kriegsman ......... H04L 67/1001 709/229 |
| 5,999,274 A | 11/1999 | Lee et al. |
| 6,006,264 A | 12/1999 | Colby et al. |
| 6,016,512 A | 1/2000 | Huitema |
| 6,026,452 A | 1/2000 | Pitts |
| 6,085,234 A | 1/2000 | Pitts et al. |
| 6,038,601 A | 2/2000 | Lambert et al. |
| 6,052,718 A | 3/2000 | Gifford |
| 6,078,960 A | 4/2000 | Ballard |
| 6,018,619 A | 6/2000 | Allard et al. |
| 6,092,100 A | 7/2000 | Berstis et al. |
| 6,098,096 A | 7/2000 | Tsirigotis et al. |
| 6,108,703 A | 8/2000 | Leighton et al. |
| 6,128,279 A | 8/2000 | O'Neil et al. |
| 6,151,631 A | 10/2000 | Ansell et al. |
| 6,157,942 A | 11/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,178,160 B1 | 1/2001 | Bolton et al. |
| 6,182,111 B1 | 1/2001 | Inohara et al. |
| 6,182,125 B1 | 1/2001 | Borella et al. |
| 6,185,598 B1 | 1/2001 | Farber et al. |
| 6,192,051 B1 | 2/2001 | Lipman et al. |
| 6,205,475 B1 | 2/2001 | Pitts |
| 6,223,288 B1 | 3/2001 | Byrne |
| 6,223,209 B1 | 4/2001 | Watson et al. |
| 6,243,761 B1 | 4/2001 | Mogul et al. |
| 6,275,496 B1 | 6/2001 | Burns et al. |
| 6,256,671 B1 | 7/2001 | Strentzsch et al. |
| 6,286,043 B1 | 8/2001 | Cuomo et al. |
| 6,286,084 B1 | 9/2001 | Wexler et al. |
| 6,304,913 B1 | 9/2001 | Rune |
| 6,324,580 B1 | 10/2001 | Jindal et al. |
| 6,330,602 B1 | 11/2001 | Law et al. |
| 6,338,082 B1 | 1/2002 | Schneider |
| 6,345,308 B1 | 1/2002 | Abe |
| 6,351,743 B1 | 2/2002 | DeArdo et al. |
| 6,351,775 B1 | 2/2002 | Yu |
| 6,363,411 B1 | 2/2002 | Dugan et al. |
| 6,366,952 B2 | 3/2002 | Pitts |
| 6,374,290 B1 | 4/2002 | Scharber et al. |
| 6,377,257 B1 | 4/2002 | Borrel et al. |
| 6,386,043 B1 | 4/2002 | Millins |
| 6,389,532 B1 | 5/2002 | Gupta et al. |
| 6,405,252 B1 | 5/2002 | Gupta et al. |
| 6,408,360 B1 | 6/2002 | Chamberlain et al. |
| 6,411,967 B1 | 6/2002 | Van Renesse |
| 6,415,280 B1 | 6/2002 | Farber et al. |
| 6,430,607 B1 | 7/2002 | Kavner |
| 6,438,592 B1 | 8/2002 | Killian |
| 6,442,165 B1 | 8/2002 | Sitaraman et al. |
| 6,452,925 B1 | 8/2002 | Sistanizadeh et al. |
| 6,457,047 B1 | 9/2002 | Chandra et al. |
| 6,459,909 B1 | 9/2002 | Bilcliff et al. |
| 6,473,804 B1 | 10/2002 | Kaiser et al. |
| 6,484,143 B1 | 10/2002 | Swildens et al. |
| 6,484,161 B1 | 11/2002 | Chipalkatti et al. |
| 6,493,765 B1 | 11/2002 | Cunningham et al. |
| 6,505,241 B2 | 1/2003 | Pitts |
| 6,513,112 B1 | 1/2003 | Craig et al. |
| 6,523,036 B1 | 1/2003 | Hickman et al. |
| 6,529,910 B1 | 2/2003 | Fleskes |
| 6,529,953 B1 | 3/2003 | Van Renesse |
| 6,553,413 B1 | 3/2003 | Leighton et al. |
| 6,560,610 B1 | 4/2003 | Eatherton et al. |
| 6,564,380 B1 | 5/2003 | Murphy |
| 6,611,873 B1 | 5/2003 | Kanehara |
| 6,622,168 B1 | 8/2003 | Datta |
| 6,633,324 B2 | 9/2003 | Stephens, Jr. |
| 6,643,357 B2 | 10/2003 | Lumsden |
| 6,643,707 B1 | 11/2003 | Booth |
| 6,654,807 B2 | 11/2003 | Farber et al. |
| 6,658,462 B1 | 11/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 1/2004 | Adrangi et al. |
| 6,694,358 B1 | 2/2004 | Swildens et al. |
| 6,697,805 B1 | 2/2004 | Choquier et al. |
| 6,718,324 B2 | 3/2004 | Edlund et al. |
| 6,724,770 B1 | 4/2004 | Van Renesse |
| 6,732,237 B1 | 4/2004 | Jacobs et al. |
| 6,754,699 B2 | 5/2004 | Swildens et al. |
| 6,754,706 B1 | 6/2004 | Swildens et al. |
| 6,760,721 B1 | 6/2004 | Chasen et al. |
| 6,769,031 B1 | 7/2004 | Bero |
| 6,782,398 B1 | 7/2004 | Bahl |
| 6,785,704 B1 | 8/2004 | McCanne |
| 6,795,434 B1 | 8/2004 | Kumar et al. |
| 6,799,214 B1 | 9/2004 | Li |
| 6,804,706 B2 | 9/2004 | Pitts |
| 6,810,291 B2 | 10/2004 | Card et al. |
| 6,810,411 B1 | 10/2004 | Coughlin et al. |
| 6,829,654 B1 | 11/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 3/2005 | Orbits et al. |
| 6,925,499 B1 | 7/2005 | Chen et al. |
| 6,928,467 B2 | 8/2005 | Peng et al. |
| 6,928,485 B1 | 8/2005 | Krishnamurthy et al. |
| 6,941,562 B2 | 8/2005 | Gao et al. |
| 6,944,167 B1 | 9/2005 | McPherson |
| 6,950,848 B1 | 9/2005 | Yousefi'zadeh et al. |
| 6,961,783 B1 | 9/2005 | Cook et al. |
| 6,963,850 B1 | 11/2005 | Bezos et al. |
| 6,968,389 B1 * | 11/2005 | Menditto ............ H04L 61/4511 709/219 |
| 6,976,090 B2 | 12/2005 | Ben-Shaul et al. |
| 6,981,017 B1 | 12/2005 | Kasriel et al. |
| 6,981,025 B1 | 12/2005 | Frazier et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 1/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |

(56) References Cited

U.S. PATENT DOCUMENTS

| | | |
|---|---|---|
| 7,032,010 B1 | 4/2006 | Swildens et al. |
| 7,058,633 B1 | 4/2006 | Gnagy et al. |
| 7,058,706 B1 | 6/2006 | Iyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 6/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,095,715 B2 | 8/2006 | Buckman et al. |
| 7,096,266 B2 | 8/2006 | Lewin et al. |
| 7,099,936 B2 | 8/2006 | Chase et al. |
| 7,103,645 B2 | 8/2006 | Leighton et al. |
| 7,114,160 B2 | 9/2006 | Suryanarayana et al. |
| 7,117,262 B2 | 9/2006 | Bai et al. |
| 7,133,905 B2 | 10/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 11/2006 | Dang et al. |
| 7,149,747 B1 | 12/2006 | Cheng et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,165,117 B1 | 1/2007 | Sitaraman et al. |
| 7,171,469 B2 | 1/2007 | Ackaouy et al. |
| 7,174,382 B2 | 1/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 2/2007 | Kasriel et al. |
| 7,194,522 B1 | 3/2007 | Swildens et al. |
| 7,194,552 B1 | 3/2007 | Schneider |
| 7,200,667 B2 | 3/2007 | Teodosiu et al. |
| 7,200,673 B1 | 4/2007 | Augart |
| 7,216,170 B2 | 4/2007 | Ludvig et al. |
| 7,225,254 B1 | 5/2007 | Swildens et al. |
| 7,228,350 B2 | 5/2007 | Hong et al. |
| 7,228,359 B1 | 6/2007 | Monteiro |
| 7,233,978 B2 | 6/2007 | Overton et al. |
| 7,240,100 B1 | 6/2007 | Wein et al. |
| 7,249,196 B1 | 7/2007 | Peiffer et al. |
| 7,251,675 B1 | 7/2007 | Kamakura et al. |
| 7,254,626 B1 | 7/2007 | Kommula et al. |
| 7,272,227 B1 | 7/2007 | Beran |
| 7,254,634 B1 | 8/2007 | Davis et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,284,056 B2 | 9/2007 | Ramig |
| 7,289,519 B1 | 10/2007 | Liskov |
| 7,293,093 B2 | 10/2007 | Leighton |
| 7,302,608 B1 * | 11/2007 | Acharya ............ G06F 11/2041 714/6.32 |
| 7,308,499 B2 | 11/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 1/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 3/2008 | Taft et al. |
| 7,363,291 B1 | 4/2008 | Page |
| 7,363,626 B2 | 4/2008 | Koutharapu et al. |
| 7,370,089 B2 | 4/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 5/2008 | Sitaraman et al. |
| 7,392,236 B2 | 6/2008 | Rusch et al. |
| 7,398,301 B2 | 6/2008 | Hennessey et al. |
| 7,406,512 B2 | 7/2008 | Swildens et al. |
| 7,406,522 B2 | 7/2008 | Riddle |
| 7,409,712 B1 | 7/2008 | Brooks et al. |
| 7,430,610 B2 | 8/2008 | Pace et al. |
| 7,441,045 B2 | 9/2008 | Skene et al. |
| 7,441,261 B2 | 10/2008 | Slater et al. |
| 7,451,230 B2 | 10/2008 | Corrado et al. |
| 7,454,457 B1 | 11/2008 | Lowery et al. |
| 7,454,500 B1 | 11/2008 | Hsu et al. |
| 7,461,170 B1 | 11/2008 | Taylor et al. |
| 7,464,142 B2 | 12/2008 | Flurry et al. |
| 7,472,201 B1 | 12/2008 | Aitken |
| 7,478,148 B2 | 1/2009 | Neerdaels |
| 7,492,720 B2 | 1/2009 | Pruthi et al. |
| 7,496,651 B1 | 2/2009 | Joshi |
| 7,499,998 B2 | 2/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,705 B1 | 3/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 4/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 6/2009 | Lovett et al. |
| 7,565,407 B1 | 7/2009 | Hayball |
| 7,568,032 B2 | 7/2009 | Feng et al. |
| 7,573,916 B1 | 7/2009 | Bechtolsheim et al. |
| 7,574,499 B1 | 8/2009 | Swildens et al. |
| 7,581,009 B1 | 8/2009 | Hsu et al. |
| 7,593,935 B2 | 8/2009 | Sullivan |
| 7,584,507 B1 | 9/2009 | Nucci |
| 7,594,189 B1 | 9/2009 | Walker et al. |
| 7,596,619 B2 | 9/2009 | Leighton et al. |
| 7,603,439 B2 | 9/2009 | Dilley et al. |
| 7,613,815 B1 | 10/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,631,101 B2 | 11/2009 | Sullivan et al. |
| 7,626,940 B2 | 12/2009 | Jain |
| 7,640,296 B2 | 12/2009 | Fuchs et al. |
| 7,650,376 B1 | 1/2010 | Blumenau |
| 7,653,689 B1 | 1/2010 | Champagne et al. |
| 7,653,700 B1 | 1/2010 | Bahl et al. |
| 7,653,725 B2 | 1/2010 | Yahiro et al. |
| 7,657,613 B1 | 1/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 2/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,685,270 B1 | 3/2010 | Vermeulen et al. |
| 7,685,273 B1 | 3/2010 | Anastas et al. |
| 7,693,813 B1 | 3/2010 | Cao et al. |
| 7,693,959 B2 | 4/2010 | Leighton et al. |
| 7,698,418 B2 | 4/2010 | Shimada et al. |
| 7,702,724 B1 | 4/2010 | Brydon et al. |
| 7,706,740 B2 | 4/2010 | Collins et al. |
| 7,707,071 B2 | 4/2010 | Rigole |
| 7,707,314 B2 | 4/2010 | McCarthy et al. |

(56) References Cited

U.S. PATENT DOCUMENTS

| | | |
|---|---|---|
| 7,711,647 B2 | 4/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,725,658 B2 | 5/2010 | Lang et al. |
| 7,730,187 B2 | 5/2010 | Raciborski et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,756,017 B2 | 7/2010 | Goyal et al. |
| 7,756,032 B2 | 7/2010 | Feick et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,765,304 B2 | 7/2010 | Davis et al. |
| 7,769,823 B2 | 7/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 8/2010 | Toebes et al. |
| 7,805,516 B2 | 9/2010 | Kettler et al. |
| 7,809,597 B2 | 9/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 10/2010 | Phillips et al. |
| 7,836,177 B2 | 11/2010 | Kasriel et al. |
| 7,853,719 B1 | 11/2010 | Cao et al. |
| 7,853,680 B2 | 12/2010 | Phatak |
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 1/2011 | Todd et al. |
| 7,890,989 B1 | 2/2011 | Hofrichter et al. |
| 7,899,899 B2 | 2/2011 | Joshi |
| 7,904,875 B2 | 3/2011 | Hegyi |
| 7,912,921 B2 | 3/2011 | O'Rourke et al. |
| 7,925,782 B2 | 3/2011 | Sivasubramanian et al. |
| 7,925,713 B1 | 4/2011 | Day et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 4/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,949,785 B2 | 5/2011 | Alkhatib et al. |
| 7,958,222 B1 | 5/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 6/2011 | Malmskog et al. |
| 7,991,910 B2 | 7/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,705 B1 | 8/2011 | Sebastian et al. |
| 8,010,707 B2 | 8/2011 | Elzur et al. |
| 8,019,869 B2 | 8/2011 | Kriegsman |
| 8,024,441 B2 | 9/2011 | Kommula et al. |
| 8,028,090 B2 | 9/2011 | Richardson et al. |
| 8,041,773 B2 | 9/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 10/2011 | Baumback et al. |
| 8,065,275 B2 | 11/2011 | Eriksen et al. |
| 8,069,231 B2 | 11/2011 | Schran et al. |
| 8,073,940 B1 | 11/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 1/2012 | Baumback et al. |
| 8,122,098 B1 | 2/2012 | Richardson et al. |
| 8,122,124 B1 | 2/2012 | Baumback et al. |
| 8,132,242 B1 | 2/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,175,863 B1 | 4/2012 | Ostermeyer et al. |
| 8,180,720 B1 | 5/2012 | Kovacs et al. |
| 8,190,682 B2 | 5/2012 | Paterson-Jones et al. |
| 8,195,605 B2 | 5/2012 | Chellappa et al. |
| 8,195,837 B2 | 6/2012 | McCarthy et al. |
| 8,209,695 B1 | 6/2012 | Pruyne et al. |
| 8,224,971 B1 | 6/2012 | Miller et al. |
| 8,218,965 B1 | 7/2012 | Uhlhorn et al. |
| 8,219,647 B2 | 7/2012 | Harvell et al. |
| 8,224,942 B1 | 7/2012 | Presotto et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 7/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 9/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,296,786 B2 | 10/2012 | Faust et al. |
| 8,301,600 B1 | 10/2012 | Helmick et al. |
| 8,301,645 B1 | 10/2012 | Crook |
| 8,316,124 B1 | 10/2012 | Baumback et al. |
| 8,321,568 B2 | 11/2012 | Sivasubramanian et al. |
| 8,321,588 B2 | 11/2012 | Richardson et al. |
| 8,331,370 B2 | 11/2012 | Hamilton et al. |
| 8,341,745 B1 | 12/2012 | Chat et al. |
| 8,356,074 B1 | 1/2013 | Ehrlich et al. |
| 8,380,831 B2 | 1/2013 | Barber |
| 8,380,851 B2 | 2/2013 | McCarthy et al. |
| 8,392,928 B1 | 2/2013 | Forys et al. |
| 8,396,908 B2 | 3/2013 | Moore et al. |
| 8,402,137 B2 | 3/2013 | Sivasuramanian et al. |
| 8,423,408 B1 | 3/2013 | Barnes et al. |
| 8,423,662 B1 | 4/2013 | Weihl et al. |
| 8,433,749 B2 | 4/2013 | Wee et al. |
| 8,443,167 B1 | 4/2013 | Fallone et al. |
| 8,447,831 B1 | 5/2013 | Sivasubramanian et al. |
| 8,447,854 B1 | 5/2013 | Jasinskyj |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,463,877 B1 | 5/2013 | Richardson |
| 8,458,360 B2 | 6/2013 | Richardson et al. |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 6/2013 | Farber et al. |
| 8,478,883 B2 | 7/2013 | Day et al. |

(56) References Cited

U.S. PATENT DOCUMENTS

| | | |
|---|---|---|
| 8,489,737 B2 | 7/2013 | Baumback et al. |
| 8,504,721 B2 | 7/2013 | Hsu et al. |
| 8,504,775 B2 | 8/2013 | Plamondon |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 8/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 9/2013 | Stavrou et al. |
| 8,572,208 B2 | 10/2013 | Farber et al. |
| 8,572,210 B2 | 10/2013 | Farber et al. |
| 8,577,992 B1 | 10/2013 | Richardson et al. |
| 8,577,963 B2 | 11/2013 | Trahan et al. |
| 8,589,996 B2 | 11/2013 | Ma et al. |
| 8,606,996 B2 | 11/2013 | Richardson et al. |
| 8,606,926 B2 | 12/2013 | Levitch |
| 8,612,565 B2 | 12/2013 | Schneider |
| 8,612,588 B1 | 12/2013 | Ehrlich et al. |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 1/2014 | McCarthy et al. |
| 8,645,700 B2 | 2/2014 | Smith et al. |
| 8,667,127 B2 | 2/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 3/2014 | Richardson et al. |
| 8,694,642 B2 | 4/2014 | Dempsky et al. |
| 8,712,950 B2 | 4/2014 | Smith et al. |
| 8,732,309 B1 | 4/2014 | Richardson et al. |
| 8,738,766 B1 | 5/2014 | Kazerani et al. |
| 8,745,177 B1 | 5/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 7/2014 | Sorenson, III et al. |
| 8,819,187 B1 | 8/2014 | Hofmann |
| 8,819,283 B2 | 8/2014 | Richardson et al. |
| 8,826,032 B1 | 8/2014 | Yahalom et al. |
| 8,843,625 B2 | 9/2014 | Baumback et al. |
| 8,902,897 B2 | 9/2014 | Hamilton et al. |
| 8,885,584 B2 | 11/2014 | Praveenkumar et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,466 B2 | 12/2014 | Seed et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 1/2015 | Borst et al. |
| 8,949,459 B1 | 2/2015 | Scholl |
| 8,966,318 B1 | 2/2015 | Shah |
| 8,971,328 B2 | 2/2015 | Judge et al. |
| 8,972,580 B2 | 3/2015 | Fleischman et al. |
| 8,976,711 B2 | 3/2015 | Li et al. |
| 9,003,035 B1 | 3/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 4/2015 | Sivasubramanian et al. |
| 9,037,975 B1 | 5/2015 | Taylor et al. |
| 9,071,502 B2 | 5/2015 | Baumback et al. |
| 9,075,777 B1 | 6/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,092,141 B2 | 7/2015 | Hayashi |
| 9,106,701 B2 | 7/2015 | Richardson et al. |
| 9,116,803 B1 | 8/2015 | Agrawal et al. |
| 9,118,543 B2 | 8/2015 | Baumback et al. |
| 9,118,680 B1 | 8/2015 | Dunlap et al. |
| 9,130,756 B2 | 8/2015 | Richardson et al. |
| 9,130,977 B2 | 9/2015 | Zisapel et al. |
| 9,137,210 B1 | 9/2015 | Joglekar et al. |
| 9,137,301 B1 * | 9/2015 | Dunlap ............... H04L 65/752 |
| 9,137,302 B1 | 9/2015 | Makhijani et al. |
| 9,154,551 B1 | 9/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 10/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 11/2015 | Richardson et al. |
| 9,210,099 B2 | 12/2015 | Baumback et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,253,065 B2 | 1/2016 | Richardson et al. |
| 9,251,112 B2 | 2/2016 | Richardson et al. |
| 9,276,812 B1 | 2/2016 | Nagargadde et al. |
| 9,282,032 B2 | 3/2016 | Judge et al. |
| 9,294,391 B1 | 3/2016 | Mostert |
| 9,300,535 B2 | 3/2016 | Popli et al. |
| 9,323,577 B2 | 3/2016 | Marr et al. |
| 9,332,078 B2 | 4/2016 | Sivasubramanian et al. |
| 9,367,929 B2 | 5/2016 | Bettis et al. |
| 9,386,038 B2 | 6/2016 | Martini |
| 9,391,949 B1 | 7/2016 | Richardson et al. |
| 9,407,676 B2 | 7/2016 | Archer et al. |
| 9,407,539 B1 | 8/2016 | Dickinson et al. |
| 9,407,681 B1 | 8/2016 | Richardson et al. |
| 9,407,699 B2 | 8/2016 | Sivasubramanian et al. |
| 9,444,718 B2 | 8/2016 | Khakpour et al. |
| 9,444,759 B2 | 9/2016 | Richardson et al. |
| 9,479,476 B2 | 9/2016 | Richardson et al. |
| 9,491,073 B2 | 10/2016 | Baumback et al. |
| 9,495,338 B1 | 11/2016 | Hollis et al. |
| 9,497,259 B1 | 11/2016 | Richardson et al. |
| 9,515,949 B2 | 11/2016 | Richardson et al. |
| 9,525,659 B1 * | 12/2016 | Sonkin ................... H04L 67/02 |
| 9,544,388 B1 | 1/2017 | Li et al. |
| 9,544,394 B2 | 1/2017 | Richardson et al. |
| 9,571,389 B2 | 1/2017 | Richardson et al. |
| 9,575,808 B1 * | 2/2017 | Yamala ................ G06F 9/5044 |
| 9,584,328 B1 | 2/2017 | Graham-cumming |
| 9,590,946 B2 | 2/2017 | Richardson et al. |
| 9,608,957 B2 | 3/2017 | Sivasubramanian et al. |
| 9,621,660 B2 | 3/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 4/2017 | Turpie |
| 9,660,890 B2 | 5/2017 | Baumback et al. |

(56) References Cited

U.S. PATENT DOCUMENTS

| | | | |
|---|---|---|---|
| 9,703,713 B2 | 5/2017 | Nadgowda |
| 9,699,108 B2 | 7/2017 | Popli et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 7/2017 | Richardson et al. |
| 9,742,795 B1 | 8/2017 | Radlein et al. |
| 9,760,420 B1 | 8/2017 | Letz et al. |
| 9,769,248 B1 | 9/2017 | Krishnan et al. |
| 9,774,619 B1 | 9/2017 | Radlein et al. |
| 9,787,599 B2 | 9/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 10/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 | 1/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 2/2018 | Richardson et al. |
| 9,929,959 B2 | 3/2018 | Mostert |
| 9,930,131 B2 | 3/2018 | MacCarthaigh et al. |
| 9,954,934 B2 | 3/2018 | Sivasubramanian et al. |
| 9,985,927 B2 | 4/2018 | Richardson et al. |
| 9,992,086 B1 | 5/2018 | Mizik et al. |
| 9,992,303 B2 | 6/2018 | Richardson et al. |
| 9,996,501 B1 | 6/2018 | Nelson et al. |
| 9,996,572 B2 | 6/2018 | Calder et al. |
| 10,015,237 B2 | 6/2018 | Richardson et al. |
| 10,015,241 B2 | 7/2018 | Marr et al. |
| 10,027,582 B2 | 7/2018 | Richardson et al. |
| 10,027,739 B1 | 7/2018 | Krishnan et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 7/2018 | Baldwin |
| 10,162,753 B2 | 7/2018 | Marshall et al. |
| 10,048,974 B1 * | 8/2018 | Wagner .................. G06F 9/50 |
| 10,063,459 B2 | 8/2018 | Judge et al. |
| 10,075,551 B1 | 8/2018 | Baldwin et al. |
| 10,079,742 B1 | 9/2018 | Richardson et al. |
| 10,091,096 B1 | 9/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B2 | 10/2018 | Baumback et al. |
| 10,110,694 B1 | 10/2018 | Watson et al. |
| 10,116,584 B2 | 10/2018 | Richardson et al. |
| 10,135,620 B2 | 10/2018 | Richardson et al. |
| 10,148,542 B2 | 11/2018 | Baumback et al. |
| 10,021,179 B1 | 12/2018 | Velummylum et al. |
| 10,157,135 B2 | 12/2018 | Richardson et al. |
| 10,158,729 B2 | 12/2018 | Sivasubramanian et al. |
| 10,180,993 B2 | 1/2019 | Raftery |
| 10,200,402 B2 | 1/2019 | Radlein et al. |
| 10,200,492 B2 | 2/2019 | MacCarthaigh et al. |
| 10,204,041 B2 | 2/2019 | Allen et al. |
| 10,205,644 B2 | 2/2019 | Baumback et al. |
| 10,205,698 B1 | 2/2019 | Petersen et al. |
| 10,218,584 B2 | 2/2019 | Ellsworth et al. |
| 10,225,322 B2 | 2/2019 | Richardson et al. |
| 10,225,326 B1 | 3/2019 | Puchala et al. |
| 10,225,362 B2 | 3/2019 | Watson |
| 10,225,365 B1 | 3/2019 | Hotchkies et al. |
| 10,230,819 B2 | 3/2019 | Richardson et al. |
| 10,257,307 B1 | 3/2019 | Baldwin |
| 10,264,062 B2 | 4/2019 | Richardson et al. |
| 10,270,878 B1 | 4/2019 | Uppal et al. |
| 10,284,446 B2 | 4/2019 | Baumback et al. |
| 10,305,797 B2 | 5/2019 | Richardson et al. |
| 10,311,371 B1 | 5/2019 | Hotchkies et al. |
| 10,348,639 B2 | 7/2019 | Puchala et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,430,084 B2 | 10/2019 | Goss et al. |
| 10,447,648 B2 | 10/2019 | Bliss et al. |
| 10,462,025 B2 | 10/2019 | Baumback et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 10,630,771 B1 | 4/2020 | Garza et al. |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,742,550 B2 | 8/2020 | Richardson et al. |
| 10,742,593 B1 | 8/2020 | Vasquez et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Navaneetha et al. |
| 10,812,846 B1 | 10/2020 | Vantalon et al. |
| 10,931,738 B2 | 2/2021 | Radhakrishnan et al. |
| 10,938,884 B1 | 3/2021 | Baldwin et al. |
| 10,958,501 B1 | 3/2021 | Richardson et al. |
| 11,108,729 B2 | 3/2021 | Richardson et al. |
| 11,025,747 B1 | 6/2021 | Keogh |
| 11,115,500 B2 | 9/2021 | Richardson et al. |
| 11,134,134 B2 | 9/2021 | Uppal et al. |
| 11,194,719 B2 | 12/2021 | Richardson et al. |
| 11,205,037 B2 | 12/2021 | Hollis et al. |
| 11,245,770 B2 | 2/2022 | Sivasubramanian et al. |
| 11,283,715 B2 | 3/2022 | Richardson et al. |
| 11,290,418 B2 | 3/2022 | Vasquez et al. |
| 11,297,140 B2 | 4/2022 | Puchala et al. |
| 11,303,717 B2 | 4/2022 | Watson |
| 11,330,008 B2 | 5/2022 | Uppal et al. |
| 11,336,712 B2 | 5/2022 | Richardson et al. |
| 11,362,986 B2 | 6/2022 | Thunga et al. |
| 11,381,487 B2 | 7/2022 | Howard et al. |
| 11,451,472 B2 | 9/2022 | Richardson et al. |
| 11,457,088 B2 | 9/2022 | Watson et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007404 A1 | 1/2002 | Vange et al. |
| 2002/0007413 A1 | 1/2002 | Garcia-Luna-Aceves et al. |
| 2002/0009079 A1 | 1/2002 | Jungck et al. |
| 2002/0010783 A1 | 1/2002 | Primak et al. |

(56) References Cited

U.S. PATENT DOCUMENTS

| | | |
|---|---|---|
| 2002/0010798 A1 | 1/2002 | Ben-Shaul et al. |
| 2002/0013823 A1 | 1/2002 | Eubanks |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083175 A1 | 6/2002 | Afek et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087726 A1 | 7/2002 | Macpherson et al. |
| 2002/0087797 A1 | 7/2002 | Adrangi |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133601 A1 | 9/2002 | Kennamer et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009562 A1 | 1/2003 | Heymann et al. |
| 2003/0009591 A1 | 1/2003 | Hayball et al. |
| 2003/0002641 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0093691 A1 | 5/2003 | Simon et al. |
| 2003/0097564 A1 | 5/2003 | Tewari et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135468 A1 | 7/2003 | Barbir et al. |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0204742 A1 | 10/2003 | Gupta et al. |
| 2003/0206520 A1 | 11/2003 | Wu et al. |
| 2003/0221000 A1 | 11/2003 | Cherkasova et al. |
| 2003/0225893 A1 | 12/2003 | Roese et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan et al. |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0019781 A1 | 1/2004 | Chari et al. |
| 2004/0024841 A1 | 1/2004 | Becker et al. |
| 2004/0030620 A1 | 2/2004 | Benjamin et al. |
| 2004/0032278 A1 | 2/2004 | Orii et al. |

(56) References Cited

U.S. PATENT DOCUMENTS

| | | |
|---|---|---|
| 2004/0034744 A1 | 2/2004 | Karlsson et al. |
| 2004/0039798 A1 | 2/2004 | Hotz et al. |
| 2004/0044731 A1 | 2/2004 | Chen et al. |
| 2004/0044791 A1 | 3/2004 | Pouzzner |
| 2004/0049579 A1 | 3/2004 | Ims et al. |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 4/2004 | Haneda et al. |
| 2004/0098478 A1 | 5/2004 | Koetke et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 6/2004 | Trossen |
| 2004/0128346 A1 | 7/2004 | Melamed et al. |
| 2004/0148520 A1 | 7/2004 | Talpade et al. |
| 2004/0167981 A1 | 7/2004 | Douglas et al. |
| 2004/0167982 A1 | 8/2004 | Cohen et al. |
| 2004/0170379 A1 | 8/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 10/2004 | Swildens et al. |
| 2004/0221034 A1 | 11/2004 | Kausik et al. |
| 2004/0246948 A1 | 11/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truty |
| 2004/0267907 A1 | 12/2004 | Gustafsson |
| 2005/0004945 A1 | 1/2005 | Cossins et al. |
| 2005/0010653 A1 | 1/2005 | McCanne |
| 2005/0010961 A1* | 1/2005 | Hagen .............. H04N 7/165 725/120 |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 1/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0076137 A1 | 4/2005 | Tang et al. |
| 2005/0102683 A1 | 4/2005 | Branson et al. |
| 2005/0097445 A1 | 5/2005 | Day et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 5/2005 | Lumsden |
| 2005/0132083 A1 | 6/2005 | Raciborski et al. |
| 2005/0147088 A1 | 6/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 7/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192814 A1 | 8/2005 | Challener et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 10/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 11/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0020807 A1 | 1/2006 | Aura et al. |
| 2006/0021001 A1 | 1/2006 | Giles et al. |
| 2006/0026067 A1 | 1/2006 | Nicholas et al. |
| 2006/0026154 A1 | 2/2006 | Altinel et al. |
| 2006/0026592 A1* | 2/2006 | Simonen .............. G06F 9/5044 718/1 |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 2/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 3/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 4/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 5/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |

(56) References Cited

U.S. PATENT DOCUMENTS

| | | |
|---|---|---|
| 2006/0143442 A1 | 6/2006 | Smith |
| 2006/0146820 A1 | 6/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0168240 A1 | 7/2006 | Olshefski |
| 2006/0173957 A1 | 7/2006 | Robinson |
| 2006/0173855 A1 | 8/2006 | Turner et al. |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 8/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0235941 A1 | 10/2006 | Areas et al. |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 11/2006 | Lewin et al. |
| 2006/0070060 A1 | 12/2006 | Tantawi et al. |
| 2006/0282505 A1 | 12/2006 | Hasha et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 1/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 2/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 3/2007 | Juneau |
| 2007/0086429 A1 | 4/2007 | Lawrence et al. |
| 2007/0094361 A1 | 4/2007 | Nowski et al. |
| 2007/0101377 A1 | 4/2007 | Six et al. |
| 2007/0101061 A1 | 5/2007 | Baskaran et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 5/2007 | Lieu |
| 2007/0156726 A1 | 6/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 7/2007 | Wong et al. |
| 2007/0195800 A1 | 8/2007 | Yang et al. |
| 2007/0198982 A1 | 8/2007 | Bolan et al. |
| 2007/0204107 A1 | 8/2007 | Greenfield et al. |
| 2007/0208737 A1 | 8/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 9/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 10/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0005275 A1 | 1/2008 | Overton et al. |
| 2008/0008089 A1 | 1/2008 | Bornstein et al. |
| 2008/0016233 A1 | 1/2008 | Schneider |
| 2008/0028463 A1 | 1/2008 | Dagon et al. |
| 2008/0222647 A1 | 1/2008 | Taylor et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 2/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071925 A1 | 3/2008 | Leighton et al. |
| 2008/0071987 A1 | 3/2008 | Karn et al. |
| 2008/0072264 A1 | 3/2008 | Crayford |
| 2008/0082551 A1 | 3/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 4/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 5/2008 | Georgis et al. |
| 2008/0140800 A1 | 6/2008 | Farber et al. |

(56) References Cited

U.S. PATENT DOCUMENTS

| | | |
|---|---|---|
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 6/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0175222 A1 | 7/2008 | Barnea et al. |
| 2008/0184357 A1 | 7/2008 | Drako et al. |
| 2008/0189437 A1 | 7/2008 | Halley |
| 2008/0201332 A1 | 8/2008 | Souders et al. |
| 2008/0201401 A1 | 8/2008 | Pugh et al. |
| 2008/0201711 A1* | 8/2008 | Amir Husain ........ G06F 9/5077 718/1 |
| 2008/0025304 A1 | 9/2008 | Venkataswami et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 10/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |
| 2008/0301670 A1 | 11/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0013321 A1* | 1/2009 | Mattiocco ............... G06F 9/455 718/1 |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 2/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 3/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0109854 A1 | 4/2009 | Rajpathak |
| 2009/0112703 A1 | 4/2009 | Brown |
| 2009/0125393 A1 | 5/2009 | Hwang et al. |
| 2009/0125902 A1* | 5/2009 | Ghosh ................. G06F 9/45533 718/1 |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 5/2009 | Winkler et al. |
| 2009/0144412 A1 | 6/2009 | Ferguson et al. |
| 2009/0144496 A1 | 6/2009 | Kawaguchi |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0157899 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 6/2009 | Ramos et al. |
| 2009/0172167 A1 | 7/2009 | Drai et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 7/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 8/2009 | Trostle |
| 2009/0233623 A1 | 9/2009 | Johnson |
| 2009/0241167 A1 | 9/2009 | Moore |
| 2009/0248697 A1 | 9/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 10/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 11/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 1/2010 | Klein |
| 2010/0030914 A1 | 2/2010 | Sparks et al. |
| 2010/0034381 A1 | 2/2010 | Trace et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 2/2010 | Glasser |
| 2010/0058352 A1* | 3/2010 | Esfahany ................. G06F 9/505 718/105 |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 3/2010 | Wood et al. |
| 2010/0082787 A1 | 4/2010 | Kommula et al. |
| 2010/0088367 A1 | 4/2010 | Brown et al. |

(56) References Cited

U.S. PATENT DOCUMENTS

| | | | |
|---|---|---|---|
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 4/2010 | Bappu et al. |
| 2010/0161564 A1 | 4/2010 | Lee et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 5/2010 | Sullivan et al. |
| 2010/0106934 A1 | 6/2010 | Calder et al. |
| 2010/0138921 A1* | 6/2010 | Na .................... H04L 63/1458 726/22 |
| 2010/0150155 A1 | 6/2010 | Napierala |
| 2010/0161565 A1 | 6/2010 | Lee et al. |
| 2010/0161799 A1 | 6/2010 | Maloo |
| 2010/0169392 A1 | 6/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 8/2010 | Wei |
| 2010/0025071 A1 | 9/2010 | Cadwell et al. |
| 2010/0226372 A1 | 9/2010 | Watanabe |
| 2010/0228819 A1* | 9/2010 | Wei .................... H04L 67/1001 718/1 |
| 2010/0235915 A1 | 9/2010 | Memon et al. |
| 2010/0257024 A1 | 9/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 10/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029598 A1 | 1/2011 | Arnold et al. |
| 2011/0029398 A1 | 2/2011 | Boudville |
| 2011/0035469 A1 | 2/2011 | Smith et al. |
| 2011/0040893 A1 | 2/2011 | Karaoguz et al. |
| 2011/0051738 A1 | 2/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 3/2011 | Jana et al. |
| 2011/0082916 A1 | 4/2011 | Swanson et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 4/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 6/2011 | Armentrout et al. |
| 2011/0182290 A1 | 7/2011 | Perkins |
| 2011/0191445 A1 | 7/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0202705 A1 | 8/2011 | Hayashi et al. |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 8/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 9/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 10/2011 | Huang et al. |
| 2011/0276623 A1 | 11/2011 | Girbal |
| 2011/0282988 A1 | 11/2011 | Wang et al. |
| 2011/0296053 A1 | 11/2011 | Medved et al. |
| 2011/0295940 A1 | 12/2011 | Saleem et al. |
| 2011/0295942 A1 | 12/2011 | Raghunath et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0005673 A1 | 1/2012 | Cervantes et al. |
| 2012/0011190 A1 | 1/2012 | Driesen et al. |
| 2012/0011509 A1* | 1/2012 | Husain .................. G06F 9/5088 718/1 |
| 2012/0014249 A1 | 1/2012 | Mao et al. |
| 2012/0023226 A1 | 1/2012 | Petersen et al. |
| 2012/0036238 A1 | 1/2012 | Sundaram et al. |
| 2012/0031626 A1 | 2/2012 | Clayton et al. |
| 2012/0041899 A1 | 2/2012 | Greene et al. |
| 2012/0041970 A1 | 2/2012 | Ghosh et al. |
| 2012/0042381 A1 | 2/2012 | Antonakakis et al. |
| 2012/0054860 A1 | 2/2012 | Wyschogrod et al. |
| 2012/0066360 A1 | 3/2012 | Ghosh |
| 2012/0066681 A1* | 3/2012 | Levy .................. G06F 9/45558 718/1 |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 3/2012 | Safruti et al. |
| 2012/0023090 A1 | 4/2012 | Holloway et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 4/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 5/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |

(56) References Cited

U.S. PATENT DOCUMENTS

| | | |
|---|---|---|
| 2012/0169646 A1 | 6/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 7/2012 | Hesketh et al. |
| 2012/0198071 A1 | 8/2012 | Black et al. |
| 2012/0204176 A1* | 8/2012 | Tian ................ G06F 9/505 718/1 |
| 2012/0209942 A1 | 8/2012 | Zehavi et al. |
| 2012/0222005 A1 | 8/2012 | Harris et al. |
| 2012/0224516 A1 | 8/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 9/2012 | Kim et al. |
| 2012/0257628 A1 | 10/2012 | Bu et al. |
| 2012/0259954 A1 | 10/2012 | McCarthy et al. |
| 2012/0266231 A1 | 10/2012 | Spiers et al. |
| 2012/0272224 A1 | 10/2012 | Brackman |
| 2012/0278229 A1 | 10/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 11/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1* | 1/2013 | Li .................. H04N 21/64723 709/224 |
| 2013/0018945 A1 | 1/2013 | Vendrow et al. |
| 2013/0019311 A1 | 1/2013 | Swildens et al. |
| 2013/0034099 A1 | 1/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0067530 A1 | 2/2013 | Spektor et al. |
| 2013/0061306 A1 | 3/2013 | Sinn |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1* | 3/2013 | Thireault ................ H04L 41/40 709/224 |
| 2013/0080627 A1 | 3/2013 | Kukreja et al. |
| 2013/0080636 A1 | 3/2013 | Friedman et al. |
| 2013/0086001 A1 | 3/2013 | Bhogal et al. |
| 2013/0084898 A1 | 4/2013 | Li et al. |
| 2013/0089005 A1 | 4/2013 | Li et al. |
| 2013/0095806 A1 | 4/2013 | Salkintzis et al. |
| 2013/0103834 A1 | 4/2013 | Dzerve et al. |
| 2013/0111035 A1 | 4/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0132854 A1 | 5/2013 | Raleigh et al. |
| 2013/0133057 A1 | 5/2013 | Yoon et al. |
| 2013/0136138 A1 | 5/2013 | Miller et al. |
| 2013/0151646 A1 | 5/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0227559 A1* | 8/2013 | Tsirkin ................ G06F 9/45558 718/1 |
| 2013/0246567 A1 | 8/2013 | Green et al. |
| 2013/0247061 A1* | 9/2013 | Kiehn .................. G06F 9/5044 718/104 |
| 2013/0254269 A1 | 9/2013 | Sivasubramanian et al. |
| 2013/0254879 A1 | 9/2013 | Chesla et al. |
| 2013/0263256 A1 | 9/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 10/2013 | Mankovski et al. |
| 2013/0305083 A1 | 11/2013 | Machida |
| 2013/0311555 A1 | 11/2013 | Laoutaris et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318525 A1* | 11/2013 | Palanisamy ........... G06F 9/5066 718/1 |
| 2013/0339429 A1 | 11/2013 | Richardson et al. |
| 2013/0346465 A1 | 12/2013 | Maltz et al. |
| 2013/0346470 A1* | 12/2013 | Obstfeld ............... G06F 9/5044 709/201 |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0032658 A1 | 1/2014 | Falls |
| 2014/0036675 A1 | 1/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 2/2014 | Marr et al. |
| 2014/0082614 A1 | 3/2014 | Klein et al. |
| 2014/0089917 A1 | 3/2014 | Attalla et al. |
| 2014/0108672 A1 | 3/2014 | Ou et al. |
| 2014/0108474 A1 | 4/2014 | David et al. |
| 2014/0109095 A1* | 4/2014 | Farkash ............... G06F 11/1443 718/102 |
| 2014/0122698 A1 | 4/2014 | Batrouni et al. |
| 2014/0119194 A1 | 5/2014 | Raciborski et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164817 A1 | 5/2014 | Bartholomy et al. |
| 2014/0164584 A1 | 6/2014 | Joe et al. |
| 2014/0165061 A1 | 6/2014 | Greene et al. |
| 2014/0172944 A1 | 6/2014 | Newton et al. |
| 2014/0181268 A1 | 6/2014 | Stevens et al. |
| 2014/0195686 A1 | 6/2014 | Yeager et al. |
| 2014/0189069 A1 | 7/2014 | Gero et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297870 A1 | 9/2014 | Eggleston et al. |
| 2014/0297866 A1 | 10/2014 | Ennaji et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |

(56) References Cited

U.S. PATENT DOCUMENTS

| | | | |
|---|---|---|---|
| 2014/0324774 A1 | 10/2014 | Chen et al. |
| 2014/0325155 A1 | 10/2014 | Marshall et al. |
| 2014/0331328 A1 | 10/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 1/2015 | Yum |
| 2015/0036493 A1 | 2/2015 | CJ et al. |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 3/2015 | Bergman |
| 2015/0106864 A1 | 4/2015 | Li et al. |
| 2015/0154051 A1 | 4/2015 | Kruglick |
| 2015/0130813 A1* | 5/2015 | Taraki ............... G06T 11/001 |
| | | 345/441 |
| 2015/0149600 A1 | 5/2015 | Thibeault et al. |
| 2015/0149631 A1 | 5/2015 | Lissack |
| 2015/0156172 A1 | 6/2015 | Nandi et al. |
| 2015/0156279 A1 | 6/2015 | Vaswani et al. |
| 2015/0163273 A1 | 6/2015 | Radcliffe et al. |
| 2015/0180995 A1 | 6/2015 | Hofmann |
| 2015/0188734 A1 | 6/2015 | Petrov |
| 2015/0189042 A1 | 7/2015 | Sun et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0264009 A1 | 9/2015 | Scharber et al. |
| 2015/0271031 A1 | 9/2015 | Beevers |
| 2015/0281367 A1 | 10/2015 | Nygren et al. |
| 2015/0288647 A1 | 10/2015 | Chhabra et al. |
| 2015/0317118 A1 | 11/2015 | Orikasa et al. |
| 2015/0339136 A1 | 11/2015 | Suryanarayanan et al. |
| 2015/0341431 A1 | 11/2015 | Hartrick et al. |
| 2015/0358276 A1 | 11/2015 | Liu et al. |
| 2015/0347311 A1 | 12/2015 | Tanaka et al. |
| 2015/0350365 A1 | 12/2015 | Khakpour et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006645 A1* | 1/2016 | Rave ..................... H04L 45/02 |
| | | 709/203 |
| 2016/0006672 A1 | 1/2016 | Saavedra |
| 2016/0021197 A1 | 1/2016 | Pogrebinsky et al. |
| 2016/0028598 A1 | 1/2016 | Khakpour et al. |
| 2016/0028755 A1 | 1/2016 | Vasseur et al. |
| 2016/0036857 A1 | 1/2016 | Foxhoven et al. |
| 2016/0065475 A1 | 2/2016 | Hilt et al. |
| 2016/0072669 A1 | 3/2016 | Saavedra |
| 2016/0104346 A1 | 3/2016 | Ovalle et al. |
| 2016/0132600 A1 | 4/2016 | Woodhead et al. |
| 2016/0142251 A1 | 5/2016 | Contreras et al. |
| 2016/0182454 A1 | 5/2016 | Phonsa et al. |
| 2016/0164761 A1 | 6/2016 | Sathyanarayana et al. |
| 2016/0164799 A1 | 6/2016 | Popli et al. |
| 2016/0182542 A1 | 6/2016 | Staniford |
| 2016/0241639 A1 | 6/2016 | Brookins et al. |
| 2016/0253262 A1 | 8/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 9/2016 | Khakpour et al. |
| 2016/0337426 A1 | 10/2016 | Shribman et al. |
| 2016/0366202 A1 | 11/2016 | Phillips et al. |
| 2016/0373789 A1 | 12/2016 | Tsukagoshi |
| 2017/0024800 A1 | 1/2017 | Shah |
| 2017/0034254 A1* | 2/2017 | Salkintzis ............. H04W 76/14 |
| 2017/0041333 A1 | 2/2017 | Mahjoub et al. |
| 2017/0041428 A1 | 2/2017 | Katsev |
| 2017/0099345 A1 | 3/2017 | Leach |
| 2017/0099254 A1 | 4/2017 | Leach et al. |
| 2017/0109316 A1 | 4/2017 | Hack et al. |
| 2017/0153980 A1 | 5/2017 | Araújo et al. |
| 2017/0155678 A1 | 6/2017 | Araújo et al. |
| 2017/0155732 A1 | 6/2017 | Araújo et al. |
| 2017/0163425 A1 | 6/2017 | Kaliski, Jr. |
| 2017/0170973 A1 | 6/2017 | Gill et al. |
| 2017/0171146 A1 | 6/2017 | Sharma et al. |
| 2017/0180217 A1 | 6/2017 | Puchala et al. |
| 2017/0187768 A1 | 6/2017 | Huang et al. |
| 2017/0214761 A1 | 6/2017 | Hsu et al. |
| 2017/0257340 A1 | 7/2017 | Richardson et al. |
| 2017/0223029 A1 | 8/2017 | Sharma et al. |
| 2017/0374121 A1 | 12/2017 | Phillips et al. |
| 2018/0011913 A1 | 1/2018 | Kapanipathi et al. |
| 2018/0027040 A1 | 1/2018 | Bae |
| 2018/0077109 A1 | 1/2018 | Hoeme et al. |
| 2018/0063193 A1 | 3/2018 | Chandrashekhar et al. |
| 2018/0077110 A1 | 3/2018 | Huston, III et al. |
| 2018/0088993 A1* | 3/2018 | Gerdesmeier ......... G06F 9/5005 |
| 2018/0101324 A1* | 4/2018 | Sharma .................. G06F 16/29 |
| 2018/0173526 A1 | 6/2018 | Prinsloo et al. |
| 2018/0176615 A1 | 6/2018 | Hannu et al. |
| 2018/0191817 A1 | 6/2018 | Richardson et al. |
| 2018/0337885 A1 | 11/2018 | Singh et al. |
| 2019/0020562 A1 | 1/2019 | Richardson et al. |
| 2019/0028562 A1 | 1/2019 | Watson et al. |
| 2019/0044787 A1 | 1/2019 | Richardson et al. |
| 2019/0044846 A1 | 2/2019 | Howard et al. |
| 2019/0052518 A1 | 2/2019 | Gal et al. |
| 2019/0074982 A1 | 3/2019 | Hughes |
| 2019/0089818 A1 | 3/2019 | Choi |
| 2019/0098109 A1 | 3/2019 | Watson |
| 2019/0121739 A1 | 4/2019 | Richardson et al. |
| 2019/0129908 A1 | 4/2019 | Kumarasamy |
| 2019/0140922 A1 | 5/2019 | Ellsworth et al. |
| 2019/0173941 A1 | 5/2019 | Puchala et al. |
| 2019/0173972 A1 | 6/2019 | MacCarthaigh et al. |
| 2019/0222666 A1 | 6/2019 | Uppal et al. |
| 2019/0297137 A1 | 9/2019 | Richardson et al. |
| 2019/0032751 A1 | 10/2019 | Kalagi et al. |
| 2020/0065132 A1 | 2/2020 | Mercier et al. |
| 2020/0084268 A1 | 3/2020 | Hollis et al. |
| 2020/0193234 A1 | 6/2020 | Pai et al. |
| 2020/0195677 A1 | 6/2020 | Uppal et al. |
| 2020/0195753 A1 | 6/2020 | Richardson et al. |
| 2020/0265096 A1 | 8/2020 | Raftery |
| 2020/0287817 A1 | 9/2020 | Howard et al. |
| 2020/0366638 A1 | 11/2020 | Vasquez et al. |
| 2020/0389534 A1 | 12/2020 | Sivasubramanian et al. |
| 2020/0389541 A1 | 12/2020 | Baldwin et al. |
| 2021/0021692 A1 | 1/2021 | Richardson et al. |
| 2021/0119961 A1 | 4/2021 | Thunga et al. |
| 2021/0184958 A1 | 6/2021 | Kolar et al. |
| 2021/0185114 A1 | 6/2021 | Baldwin et al. |
| 2021/0194806 A1 | 6/2021 | Richardson et al. |
| 2021/0297365 A1 | 9/2021 | Richardson et al. |
| 2021/0367832 A1 | 11/2021 | Ramachandran et al. |
| 2022/0017401 A1 | 6/2022 | Richardson et al. |
| 2022/0224767 A1 | 7/2022 | Watson |
| 2022/0272146 A1 | 8/2022 | Richardson et al. |
| 2022/0407933 A1 | 12/2022 | Swaminathan |

FOREIGN PATENT DOCUMENTS

| | | |
|---|---|---|
| CN | 1422468 A | 6/2003 |
| CN | 1511399 A | 7/2004 |
| CN | 1605182 A | 4/2005 |
| CN | 101189598 A | 5/2008 |
| CN | 101431539 A | 5/2009 |
| CN | 101460907 A | 6/2009 |
| CN | 101631133 A | 1/2010 |
| CN | 103152357 A | 6/2013 |
| CN | 103731481 A | 4/2014 |
| CN | 104995935 A | 10/2015 |
| DE | 60318825 T2 | 1/2009 |

(56) References Cited

FOREIGN PATENT DOCUMENTS

| | | |
|---|---|---|
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 3748216 B2 | 2/2006 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2001/045349 A2 | 6/2001 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2015/119606 A1 | 8/2015 |
| WO | WO 2017/106455 A1 | 6/2017 |
| WO | WO 2018/236597 A1 | 12/2018 |

OTHER PUBLICATIONS

Second Office Action in Chinese Application No. 201610828846.3 dated Aug. 5, 2020.
Office Action issued in connection with European Patent Application No. 18734734 dated Oct. 19, 2020.
Examination Report in Indian Application No. 201918034730 dated Mar. 9, 2022 in 7 pages.
Communication regarding the expiry of the time limit within which notice of opposition may be filed in Application No. 16876655.8 dated Jun. 29, 2022.
"Non-Final Office Action dated Jan. 3, 2012," U.S. Appl. No. 12/652,541; dated Jan. 3, 2012; 35 pages.
"Final Office Action dated Sep. 5, 2012," U.S. Appl. No. 12/652,541; dated Sep. 5, 2012; 40 pages.
"Notice of Allowance dated Jan. 4, 2013," U.S. Appl. No. 12/652,541; dated Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with Serverlron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls,";login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006),pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Imple-

(56) References Cited

OTHER PUBLICATIONS mentation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms For Replicated Database Maintenance," 1987, Proceedings of the sixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Frangoudis et al., "PTPv2-based network load estimation and its application to QoE monitoring for Over-the-Top services", IEEE, The 5th International conference on Information, Intelligence, Systems and Applications, USA 2014, XP032629858, Jul. 7, 2014, pp. 176-181.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al., "Measuring Round Trip Times to determine the Distance between WLAN Nodes",May 2005, In Proc. of Networking 2005, all pages.
Gunther et al., "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al., Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International, vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables_Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al., "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.

(56) References Cited

OTHER PUBLICATIONS

Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-20Q5-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011 -516466 dated May 30, 2016.
Office Action in Japanese Application No. 2011-516466 dated Mar. 6, 2017.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Extended Search Report in European Application No. 19184826.6 dated Jan. 17, 2020.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
Office Action in European Application No. 11767118.0 dated Jan. 29, 2019.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
Examination Report in Indian Application No. 3105/DELNP/2013, dated Feb. 19, 2019.

(56) References Cited

OTHER PUBLICATIONS

International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Extended Search Report in European Application No. 18156163 dated Sep. 3, 2018.
Examination Report in Indian Application No. 4487/DELNP/2013 dated Dec. 28, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
Office Action in European Application No. 13770602.4 dated Mar. 11, 2019.
Office Action in Indian Application No. 2823/DELNP/2015 dated Oct. 25, 2019.
Office Action in Brazilian Application No. BR112015005588-5 dated Jan. 14, 2020.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Reporton Patentability in PCT/US/2016/066848 dated Jun. 19, 2018.
Extended European Search Report in Application No. 16876655.8 dated Aug. 20, 2019.
Partial Search Report in European Application No. 16876655.8 dated May 15, 2019.
International Search Report and Written Opinion in PCT/US2017/055156 dated Dec. 13, 2017.
International Preliminary Report on Patentability and Written Opinion in PCT/US2017/055156 dated Apr. 9, 2019.
International Search Report and Written Opinion in PCT/US2018/036634 dated Sep. 11, 2018.
International Preliminary Report on Patentability and Written Opinion in PCT/US2018/036634 dated Dec. 24, 2019.
Supplementary Examination Report in Singapore Application No. 10201705920S dated Dec. 24, 2021.
First Office Action in Chinese Applicaton No. 201610112984.1 dated Mar. 20, 2018.
Second Office Action in Chinese Applicaton No. 201610112984.1 dated Feb. 2, 2019.

* cited by examiner

TABLE 510

| USER-DEFINED CODE NAME |
|---|
| FUNCTION 515 |

| USER-DEFINED CODE VERSION |
|---|
| 1.6 |

| REGIONS | STATUS | LAST REPLICATION SYNC |
|---|---|---|
| REGION 520 | REPLICATED | 12:45:32 ON 3/23/2016 |
| REGION 522 | REPLICATION IN PROGRESS - 50% | 15:02:44 ON 3/22/2016 |
| REGION 524 | REPLICATION NOT STARTED - VERSION 1.5 STORED | 22:10:31 ON 3/19/2016 |

MULTI-REGION REQUEST-DRIVEN CODE EXECUTION SYSTEM

CROSS-REFERENCE TO RELATED APPLICATIONS

This application is a continuation of U.S. patent application Ser. No. 15/391,673, entitled "MULTI-REGION REQUEST-DRIVEN CODE EXECUTION SYSTEM" and filed on Dec. 27, 2016, which is hereby incorporated by reference herein in its entirety.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 5 is an example table stored in the replication data store of FIG. 1, according to one embodiment.

DETAILED DESCRIPTION

Figure 1:
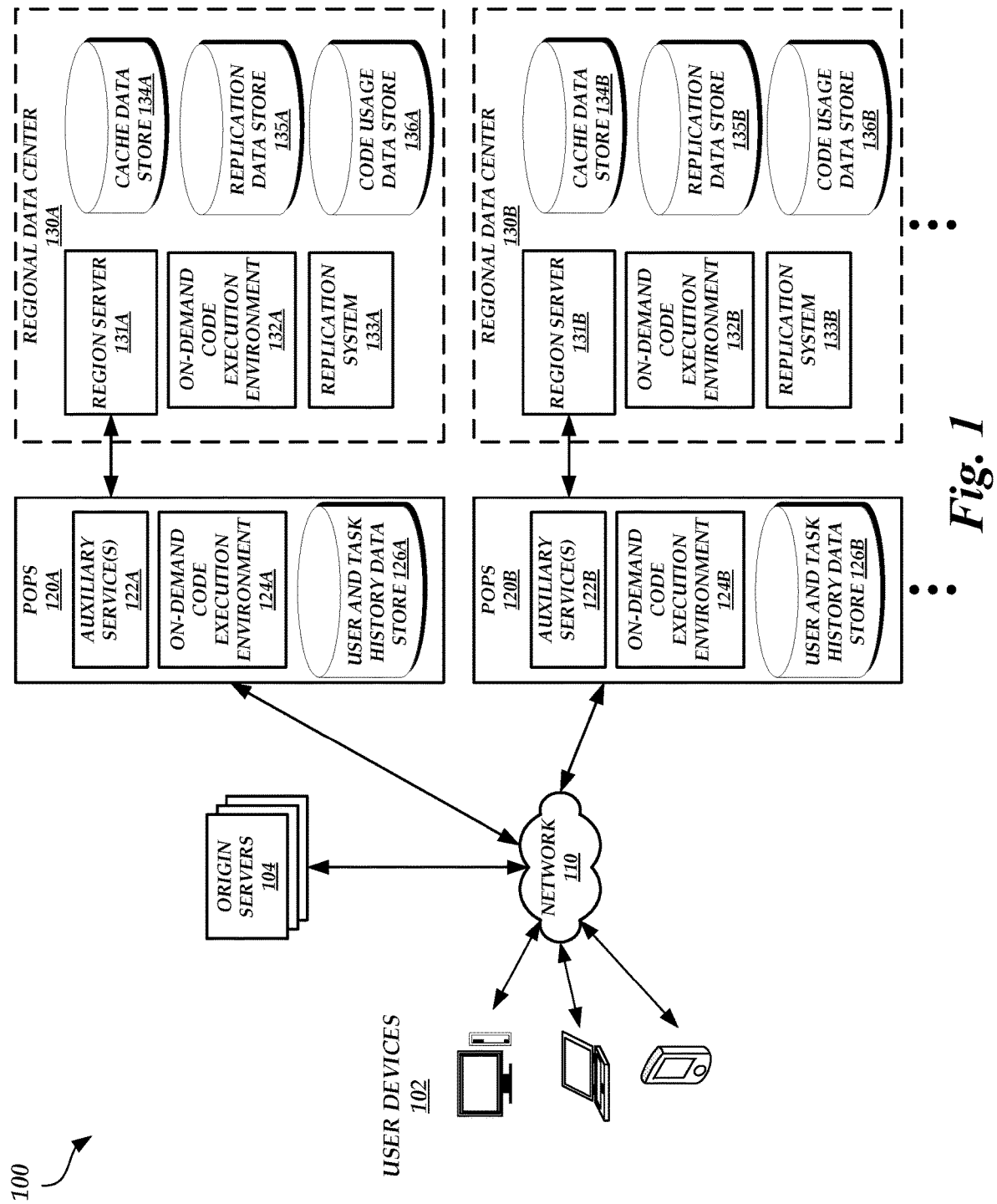
FIG. 1 is a block diagram of an illustrative operation environment in which a plurality of POPs may implement an on-demand code execution environment and a plurality of regional data centers may implement an on-demand code execution environment.

Generally described, aspects of the present disclosure relate to executing user-defined code within a low latency, on-demand code execution environment, as well as managing the computing devices within the code execution environment on which the code is executed. The on-demand code execution environment may operate as part of a system of rapidly provisioned and released computing resources, often referred to as a "cloud computing environment." Specifically, the code execution environment may include one or more computing devices, virtual or non-virtual, that are "pre-warmed" (e.g., booted into an operating system and executing a complete or substantially complete runtime environment) and configured to enable execution of user-defined code, such that the code may be executed rapidly without initializing the virtual machine instance. Each set of code on the on-demand code execution environment may define a "task," and implement specific functionality corresponding to that task when executed on the on-demand code execution environment. Individual implementations of the task on the on-demand code execution environment may be referred to as an "execution" of the task. By defining tasks on the on-demand code execution environment and selectively executing those tasks, users may implement complex functionalities at high speed and low latency, without being required to deploy, configure, or manage the computing devices on which the tasks are executed. The on-demand code execution environment, in turn, may execute tasks of multiple users simultaneously, thus allowing efficient use of computing resources of those devices. To ensure the security and privacy of user information, the on-demand code execution environment may generally ensure that tasks of each user are executed on distinct computing devices (which may be virtual computing devices), thus reducing the chances that a task executing on behalf of a first user could interfere with or gain information regarding execution of a task on behalf of a second user.

In some instances, an on-demand code execution environment may operate as a distributed system in which multiple points of presence (POPs) implement instances of the on-demand code execution environment. As used herein, a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. An on-demand code execution environment may utilize multiple POPs that are geographically diverse, to enable users in a variety of geographic locations to quickly transmit and receive information from the on-demand code execution environment. In some instances, the POPs may also implement other services, such as content delivery network (CDN) services, data storage services, data processing services, etc. For the purposes of the present disclosure, these other services will generally be referred to herein as "auxiliary services." Implementation of auxiliary services and instances of the on-demand code execution environment on the same POP may be beneficial, for example, to enable tasks executed on the on-demand code execution environment to quickly interact with the auxiliary services.

However, implementation of auxiliary services on a POP may also limit the amount of computing resources available to implement an instance of the on-demand code execution environment. For example, a POP implementing an edge server of a CDN service may have relatively little available computing resources (e.g., in the form of disk space, processor time, central processing power, graphical processing power, memory, network bandwidth, internal bus utilization, etc.) with which to execute tasks. These computing resources may be even further depleted by attempting to execute those tasks within a distinct computing device, such as a virtual computing device, that does not implement functionalities of the CDN service. Moreover, the available physical space to house the edge server may be limited, thereby limiting the amount of computing resources that can be added to the POP to account for the relatively little available computing resources. In addition, dedicating a virtual or non-virtual computing device to a single user can negatively impact the performance of the on-demand code execution environment by reducing the flexibility of the environment in allocating computing resources for the execution of tasks requested by other users. Thus, if a POP receives a sufficient number of requests to execute tasks, the POP may run out of computing resource capacity to execute the tasks. Once the POP no longer has computing resource capacity to handle the execution of a task, the POP may return an exception to the requesting entity indicating that no more computing resource capacity is available to execute the task.

Accordingly, aspects of the present disclosure enable the on-demand code execution environment to be present in POPs and in regions serviced by the POPs such that tasks can be executed regardless of whether there is a sufficient amount of computing resources available at the POP to handle task requests. Thus, if a POP determines that the computing resources necessary to execute a received task are not available (e.g., the POP lacks computing resource capacity) or that the POP should not execute the received task for another reason (e.g., the task is not commonly received and the computing resources needed to execute the task are therefore best allocated for other requests), the POP can forward the task to a region that the POP services for execution by an on-demand code execution environment present in the region. For example, if the POP implements an edge server of a CDN service, the edge server may receive from a user device a request to execute a task. The edge server may then determine whether to instruct an on-demand code execution environment local to the POP to execute the task. Some factors that the edge server may consider in making the determination include how busy the POP is (e.g., the amount of unused computing resources currently available), the popularity of the requested task (e.g., how often the POP receives requests to perform the task relative to other requested tasks), a time it may take to execute the task locally as opposed to within a region, the historical volume of requests received from the user device, the time of day that the request is received, the latency-sensitivity of the task (e.g., based on an analysis of the user-defined code), properties of the task (e.g., whether execution of the user-defined code causes the retrieval of content and, if so, whether such content is available in a local POP cache or at an origin server), and/or the like.

If the edge server determines to instruct the local on-demand code execution environment to execute the task, then the edge server forwards the requested task to the local on-demand code execution environment for execution. As described in greater detail below, the local on-demand code execution environment may instruct an existing virtual machine instance to execute the requested task or may provision a new virtual machine instance and instruct the new virtual machine instance to execute the requested task. Once the execution is complete, the local on-demand code execution environment may forward the execution results to the edge server for transmission back to the user device.

If, on the other hand, the edge server determines not to instruct the local on-demand code execution environment to execute the task, then the edge server forwards the requested task to a server in a region. The edge server may forward the task to a server in the region that is closest geographically to the POP. Alternatively, the edge server may identify or select one region from a set of regions to receive the task. Some factors that the edge server may consider in making the determination include whether a region has an updated version of the user-defined code used to execute the task, whether a region has previously received a request to execute the task and/or if the region currently has a virtual machine instance provisioned to execute such tasks, and/or the like. Once the region is selected, then the edge server forwards the task to a server in the selected region.

Upon receiving the task from the edge server, the server in the region can instruct the on-demand code execution environment local to the region to execute the task. Similar to as described above, the on-demand code execution environment in the region may instruct an existing virtual machine instance to execute the requested task or may provision a new virtual machine instance and instruct the new virtual machine instance to execute the requested task. Once the execution is complete, the on-demand code execution environment in the region can forward the execution results to the region server. The region server can then transmit the execution results to the edge server in the POP for distribution to the user device.

Generally, user-defined code is specific to a region and stored therein. Thus, to enable multiple regions to execute tasks corresponding to user-defined code associated with a particular region, each region may include a replication system configured to replicate user-defined code associated with the respective region to other regions. The replication system may track which regions to replicate the user-defined code to and the status of such replications. The replication system may periodically forward this information to the POP to aid the edge server in determining which region to forward a task request.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulates hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

To execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user-defined code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identify a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. patent application Ser. No. 14/502,648, entitled "PROGRAMMATIC EVENT DETECTION AND MESSAGE GENERATION FOR REQUESTS TO EXECUTE PROGRAM CODE" and filed Sep. 30, 2014 (hereinafter referred to as "the '648 application"), the entirety of which is hereby incorporated by reference herein. Additional details regarding the on-demand code execution environment are provided in U.S. patent application Ser. No. 14/971,859, entitled "EXECUTION LOCATIONS FOR REQUEST-DRIVEN CODE" and filed Dec. 16, 2015 (hereinafter referred to as "the '859 application"), the entirety of which is hereby incorporated by reference herein.

The foregoing aspects and many of the attendant advantages of this disclosure will become more readily appreciated as the same become better understood by reference to the following detailed description, when taken in conjunction with the accompanying drawings.

Example Multi-Region On-Demand Code Execution Environment

FIG. 1 is a block diagram of an illustrative operating environment 100 in which a plurality of POPs 120 may implement an on-demand code execution environment 124 and a plurality of regional data centers 130 may implement an on-demand code execution environment 132. The POPs 120 may further implement auxiliary services 122 and a user and task history data store 126. Various user devices 102 may communicate with the POPs 120 via a network 110 to request the execution of tasks. Tasks may be written, by way of non-limiting example, in JavaScript (e.g., node.js), Java, Python, and/or Ruby (and/or another programming language). Requests to execute a task may generally be referred to as "calls" to that task. Such calls may include the user-defined code (or the location thereof) to be executed and one or more arguments to be used for executing the user-defined code. For example, a call may provide the user-defined code of a task along with the request to execute the task. In another example, a call may identify a previously uploaded task by its name or an identifier. In yet another example, code corresponding to a task may be included in a call for the task, as well as being uploaded in a separate location (e.g., storage of auxiliary services 122 or a storage system internal to the on-demand code execution environments 124 and/or 132) prior to the request being received by the on-demand code execution environments 124 and/or 132. The on-demand code execution environments 124 and/or 132 may vary its execution strategy for a task based on where the code of the task is available at the time a call for the task is processed.

While the user devices 102 and POPs 120 are shown as grouped within FIG. 1, the user devices 102 and POPs 120 may be geographically distant, and independently owned or operated. For example, the user devices 102 could represent a multitude of users in various global, continental, or regional locations accessing the POPs 120. Further, the POPs 120 may be globally, continentally, or regionally disparate, in order to provide a wide geographical presence for the on-demand code execution environment 124 and/or the auxiliary services 122. Accordingly, the groupings of user devices 102 and POPs 120 within FIG. 1 is intended to represent a logical, rather than physical, grouping. The POPs 120 of FIG. 1 are illustratively shown as implementing both auxiliary services 122 and instances of the on-demand code execution environment 124. However, the operating environment 100 may additionally or alternatively include POPs that execute only auxiliary services 122 or only an instance of the on-demand code execution environment 124. Components of the auxiliary services 122 are described in greater detail below with respect to FIG. 2A and components of the on-demand code execution environments 124 and 132 are described in greater detail below with respect to FIG. 2B.

As illustrated in FIG. 1, each regional data center 130 may include a region server 131, an on-demand code execution environment 132, a replication system 133, a cache data store 134, a replication data store 135, and a code usage data store 136. The components of the regional data center 130 may be capable of storing user-defined code, replicating user-defined code to other regional data centers 130, and executing tasks. The regional data centers 130 may each be globally, continentally, or regionally disparate. For example, each regional data center 130 may located within a geographical region serviced by a POP 120. While FIG. 1 illustrates each POP 120 communicating with a single regional data center 130, this is not meant to be limiting. A single POP 120 may communicate with one or more regional data centers 130 (e.g., regional data centers 130 that are within a threshold distance of the location of the POP 120).

The operating environment 100 further includes one or more origin servers 104. The origin servers 104 may include any computing device owned or operated by an entity that has provided one or more sets of content ("distributions") to a CDN for subsequent transmission to user devices 102. For example, origin servers 104 may include servers hosting web sites, streaming audio, video, or multimedia services, data analytics services, or other network-accessible services. The origin servers 104 may include primary versions of content within various distributions. If the POPs 120 function as CDNs, the primary versions of content may be retrieved by the various POPs 120 for subsequent transmission to the user devices 102. In an embodiment, the POPs 120 includes a cache that stores frequently-requested content (e.g., service data store 208) and the regional data centers 130 include caches that store frequently-requested content (e.g., the cache data store 134). If requested content is not present in the POP 120 cache, the POP 120 may first request the content from the regional data center 130. If the requested content is also not present in the cache data store 134, then the POP 120 may retrieve the content from an origin server 104. In addition, origin servers 104 may be included in a regional data center 130, in addition to or as an alternative to cache data store 134.

Users, by way of user devices 102, may interact with the on-demand code execution environments 124 and/or 132 to provide executable code, and establish rules or logic defining when and how such code should be executed on the on-demand code execution environments 124 and/or 132. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environments 124 and/or 132, and request that the on-demand code execution environments 124 and/or 132 execute the code using one or more pre-established virtual machine instances. The on-demand code execution environments 124 and 132 can handle the acquisition and configuration of compute capacity (e.g., containers, instances, etc., which are described in greater detail below) based on the code execution request, and execute the code using the compute capacity. The on-demand code execution environments 124 and/or 132 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

In an embodiment, a user device 102 may transmit a request to execute a task to POP 120A or 120B via the network 110. The request may be received by a server in the auxiliary services 122 (e.g., server 207). The server may then determine whether to execute the task locally or to forward the task to a region server 131 in one of the regional data centers 130. For example, the server may use information stored in the user and task history data store 126 as well as information identifying how busy the POP 120 is (e.g., the amount of unused computing resources currently available to the POP 120), a time it may take to execute the task locally at the POP 120 (e.g., which is based on properties of the user-defined code used to execute the task and the available computing resources, such as whether a virtual machine instance is already provisioned to execute the task), a time it may take to execute the task within a regional data center 130 (e.g., which is based on properties of the user-defined code used to execute the task and whether a virtual machine instance is already provisioned in the on-demand code execution environment 132 to execute the task), the time of day that the request is received, and/or the like to determine whether to execute the task locally or to forward the task to a region server 131.

The information stored in the user and task history data store 126 may include the popularity of the requested task (e.g., how often the POP 120 receives requests to perform the task relative to other requested tasks), the historical volume of requests received from the user device 102 that requested the task execution, the latency-sensitivity of the task, properties of the task (e.g., what type of content is retrieved as a result of execution of the task), and/or the like. The latency-sensitivity of the task and/or the properties of the task may be determined based on a previous or current analysis of the user-defined code. As an example, the user-defined code may be stored within a regional data center 130 that is associated with the same region as the user-defined code. The server in the auxiliary service 122 may retrieve the user-defined code from the appropriate regional data center 130 (e.g., at a previous time so that the POP 120 could execute a previously-received task or at a current time) and analyze the user-defined code to estimate whether a use case associated with the task is sensitive to delays in task execution and/or to identify other properties of the task. As an illustrative example, based on an analysis of the user-defined code, the server may determine that execution causes a script to be run (e.g., Javascript). Other components or code modules may be dependent on the completion of the script (e.g., other components to be loaded in order to display a network or content page) and therefore the task may be latency sensitive. On the other hand, the analysis may result in a determination that the task relates to decompressing bits, which is less latency sensitive. As another illustrative example, based on an analysis of the user-defined code, the server may determine that execution of the task results in the retrieval of content stored in an origin server 104.

The server may consider some or all of the above-described factors independently or in combination to determine whether to execute the task locally or remotely in a regional data center 130. For example, if the server determines that the amount of unused computing resources currently available to the POP 120 is not sufficient to execute the task, then the server determines to forward the task to a region server 131. Otherwise, if the server determines that the amount of unused computing resources currently available to the POP 120 is sufficient to execute the task and no other factors indicate that the task should be executed remotely, then the server may instruct the on-demand code execution environment 124 to execute the task.

As another example, if the server determines that the time it would take to execute the task locally at the POP 120 is faster than the time it would take to execute the task remotely in a regional data center 130, then the server may instruct the on-demand code execution environment 124 to execute the task. Otherwise, if the server determines that the time it would take to execute the task locally at the POP 120 is slower than the time it would take to execute the task remotely in a regional data center 130, then the server may forward the task to the regional data center 130.

As another example, if the task is not commonly received (e.g., the task has not been received before, the number of times the task has been received is below a threshold value, the number of times the task has been received as a percentage of a number of times any task has been received is below a threshold value, etc.) and/or the user device 102 typically sends a low volume of requests (e.g., the user device 102 sends a number of requests below a threshold value, the percentage of requests sent by the user device 102 as a percentage of all requests received is below a threshold value, a time required by the user device 102 to execute all desired tasks is below a threshold value, etc.), then the server may forward the task to the regional data center 130. Provisioning a virtual machine instance to service a user device 102 and/or request and tearing down the virtual machine instance when tasks are completed can be time and resource intensive, and therefore the server may determine to offload the task to a regional data center 130 if the task is uncommon or the user device 102 sends a low volume of requests (and thus does not require the virtual machine instance for a long period of time). Otherwise, if the task is commonly received (e.g., the number of times the task has been received is above a threshold value, the number of times the task has been received as a percentage of a number of times any task has been received is above a threshold value, etc.) and/or the user device 102 typically sends a high volume of requests (e.g., the user device 102 sends a number of requests above a threshold value, the percentage of requests sent by the user device 102 as a percentage of all requests received is above a threshold value, a time required by the user device 102 to execute all desired tasks is above a threshold value, etc.), then the server may instruct the on-demand code execution environment 124 to execute the task.

As another example, if the task request is received during a time of day in which the POP 120 is busy (e.g., a threshold percentage of the POP 120 computing resources are occupied) and the task is not commonly received and/or the user device 102 typically sends a low volume of requests, then the server may forward the task to the regional data center 130. Otherwise, if the task request is received during a time of day in which the POP 120 is busy and the task is commonly received and/or the user device 102 typically sends a high volume of requests and/or if the task request is receive during a time of day in which the POP 120 is not busy, then the server may instruct the on-demand code execution environment 124 to execute the task.

As another example, if the server determines that the task is latency sensitive, then the server may instruct the on-demand code execution environment 124 to execute the task. Requesting the on-demand code execution environment 124 to execute the task may be faster than the regional data center 130 because of the fewer number of transmissions required to complete execution of the task (e.g., the server may not communicate directly with the on-demand code execution environment 132, so there may be additional transmissions required to forward the task to the on-demand code execution environment 132). Otherwise, if the server determines that the task is not latency sensitive and no other factors indicate that the task should be executed locally, then the server may forward the task to the regional data center 130.

As another example, if the server determines that the user-defined code properties indicate that execution of the task results in the retrieval of content stored in an origin server 104, then the server may forward the task to the regional data center 130. As described above, the POP 120 may send a request for content to the regional data center 130 first before sending a request to the origin server 104 if the content is not available in the POP 120 cache. Thus, given the limited computing resources available at the POP 120, the server may forward the task to be executed remotely because a request may be sent to the regional data center 130 anyway. Otherwise, the server may instruct the on-demand code execution environment 124 to execute the task if no other factors indicate that the task should be executed remotely.

In an embodiment, once the server determines to forward the task to a regional data center 130, the server forwards the task to the region server 131 in the regional data center 130 that is geographically closest to the POP 120. For example, the regional data center 130A may be the closest regional data center to the POP 120A. Thus, the server in the auxiliary services 122A may forward the task to the region server 131A.

In other embodiments, once the server determines to forward the task to a regional data center 130, the server then determines which regional data center 130 to send the request to. For example, it may be more efficient to forward the task to a first regional data center 130 than a second regional data center 130 even if the first regional data center 130 is farther geographically from the POP 120 than the second regional data center 130. Such situations may occur when the first regional data center 130 has received requests to execute the task before and therefore has provisioned a virtual machine instance to execute the task, whereas the second regional data center 130 has not received requests to execute the task or has not received many requests to execute the task and the time required to provision a virtual machine instance to execute the task would be longer than the time required to send the task to the first regional data center 130 for execution. In other instances, the first regional data center 130 may store a current or updated version of the user-defined code used to execute the task, whereas the second regional data center 130 stores an old or invalid version of the user-defined code.

The user and task history data store 126 may further store data identifying which regional data centers 130 have previously received requests to execute the task and/or have virtual machine instances provisioned to execute the task and which regional data centers 130 are storing a current version of the user-defined code used to execute the requested task (or any version of the user-defined code used to execute the requested task). The server can use this information to then select a regional data center 130 to receive the forwarded task. For example, the server may narrow the selection by considering regional data centers 130 that store a current version of the user-defined code. From this filtered list of regional data centers 130, the server may determine which regional data center(s) 130 have received requests to execute the task and/or have virtual machine instances provisioned to execute the task. If more than one regional data center 130 satisfies this criteria, then the server may select the regional data center 130 from those that satisfy the criteria that is closest to the POP 120. If no regional data center 130 has received requests to execute the task and/or does not have a virtual machine instance provisioned to execute the task, then the server may select the regional data center 130 that is closest to the POP 120. If no regional data center 130 accessible by the POP 120 has a current version of the user-defined code, then the server may determine whether it is necessary for the user-defined code to be current for the task to be executed. For example, the task request may include an indication of what version of the user-defined code to use to execute the task, the minimum version number of the user-defined code that is sufficient to execute the task, and/or whether the version number matters for execution of the task. If it is not necessary for the user-defined code to be current for the task to be executed, then the server may forward the task to the closest regional data center 130 that has previously received requests to execute the task and/or a virtual machine instance provisioned to execute the task (if present) or the closest regional data center 130 if no regional data center 130 has previously received requests to execute the task and/or has a virtual machine instance provisioned to execute the task. If it is necessary for the user-defined code to be current for the task to be executed, then the server may return an exception to the user device 102 indicating that a current version of the user-defined code is not available.

If the server determines to forward the task to a regional data center 130 that is not the closest regional data center 130 (or any other regional data center 130) because the closest regional data center 130 does not have a virtual machine instance provisioned to execute the task, the server may also instruct the closest regional data center 130 (or any other regional data center 130) to provision a virtual machine instance for executing the task. The server may continue to forward future tasks to the non-closest regional data center 130 until the virtual machine instance is provisioned and ready to execute the task. Once the virtual machine instance is provisioned (e.g., once the server is notified by the regional data center 130 that the virtual machine instance is provisioned), then the server may start forwarding future tasks to the closest regional data center 130 (or any other regional data center 130 instructed to provision a virtual machine instance for executing the task).

As described above, the region server 131 receives a task forwarded by the server in the auxiliary services 122. The region server 131 may then forward the task to the on-demand code execution environment 132 for execution. After execution is complete, the on-demand code execution environment 132 forwards the execution results to the region server 131. The region server 131 can then forward the execution results to the server, which then forwards the execution results to the user device 102 that requested the task execution.

As described above, tasks are executed according to user-defined code. A user (using, for example, a user device 102) may compose code for use in executing a task. The user-defined code may be associated with a particular geographic region selected by the user and stored within the regional data center 130 associated with the selected geographic region (e.g., stored within data store 260 of the on-demand code execution environment 132). To enable multiple regional data centers 130 to execute a task, the user can identify one or more other geographic regions that are authorized to execute the task. Alternatively, a default set of geographic regions can be authorized to execute the task. The authorized geographic regions can be stored in the replication data store 135 in the regional data center 130 associated with the user-defined code's geographic region in an entry associated with the user-defined code.

Once other geographic regions are authorized to execute the task, the replication system 133 in the regional data center 130 associated with the user-defined code's geographic region may replicate the bits of the user-defined code and transmit the replicated bits to the replication systems 133 in the regional data centers 130 associated with the authorized geographic regions. The replication system 133 in the regional data center 130 associated with the user-defined code's geographic region may also replicate the bits of the user-defined code and transmit the replicated bits to the replication systems 133 in the regional data centers 130 associated with the authorized geographic regions when the user-defined code is updated. The replication system 133 that replicated the user-defined code and transmitted the replicated bits can periodically request a status of the transfer from the other replication systems 133 that are receiving the replicated bits. Statuses can include a version of the user-defined code currently stored in the regional data center 130, whether the latest replication transmission is complete (and if not, the progress of the transmission), and/or whether the replication transmission has started. The replication system 133 can store the received statuses in the replication data store 135 in an entry associated with the user-defined code. Periodically, the replication system 133 can retrieve the statuses from the replication data store 135 and transmit the statuses to the POP 120 associated with the regional data center 130 for storage in the user and task history data store 126. As described above, the server in the auxiliary services 122 can use this information to select a regional data center 130 to receive a forwarded task.

As an illustrative example, a user may define code that is associated with the same geographic region as the regional data center 130A. Thus, the user-defined code may be stored in the data store 260 of the on-demand code execution environment 132A. A user may identify a geographic region associated with the regional data center 130B as a geographic region that is authorized to execute the task and this information may be stored in the replication data store 135A. Thus, the replication system 133A may replicate the user-defined code and transmit the replicated user-defined code to the replication system 133B. The replication system 133A may periodically request a status of the transfer from the replication system 133B. The received status may also be stored in the replication data store 135A. The replication system 133A may periodically transmit the received status to the POP 120A for storage in the user and task history data store 126A. The server 207A in the auxiliary services 122A can then use the status information to aid in identifying or selecting a regional data center 130 to execute the task.

In some embodiments, the POP 120 can forward the received statuses to other POPs 120 such that some or all POPs 120 are aware of which regional data centers 130 have current user-defined code and which do not. Alternatively, the replication system 133 can forward the statuses to multiple POPs 120 to achieve the same objective.

In further embodiments, one regional data center 130 can forward a task execution request to another regional data center 130 (assuming that the other regional data center 130 is authorized to execute the task). For example, the POPs 120 may not be aware of (or may not have current information of) which regional data centers 130 have previously received task requests and/or which regional data centers 130 have a virtual machine instance provisioned to execute the task. However, the regional data centers 130 may store such information. As an example, the code usage data store 136 may store information indicating which user-defined code has been used by the respective on-demand code execution environment 132 to execute a task in the past, which regional data centers 130 have previously executed a task or provisioned a virtual machine instance to execute a task, and/or which regional data centers 130 have a current version of the user-defined code. The regional data centers 130 may communicate with each other to share such information. If a region server 131 receives a task request and the region server 131 determines that such a request has not been previously received and/or a virtual machine instance is not provisioned to execute the task, the region server 131 may query the code usage data store 136 to determine whether another regional data center 130 has previously received a request to execute the task and/or has provisioned a virtual machine instance to execute the task. If such a regional data center 130 exists, the region server 131 may forward the task to the region server 131 of that regional data center 130. The results of executing the task can be transmitted back to the regional data center 130 that originally received the forwarded task request before being transmitted to the requesting POP 120 and the user device 102.

As an illustrative example, the region server 131A may receive a task request from the POP 120A. However, the on-demand code execution environment 132A may not have a virtual machine instance provisioned to execute the task. The on-demand code execution environment 132B, though, may have a virtual machine instance provisioned to execute the task. Thus, the region server 131A may forward the request to the region server 131B for execution. The region server 131B can then forward the request to the on-demand code execution environment 132B. Results of executing the task may be forwarded by the on-demand code execution environment 132B to the region server 131B, the region server 131B may forward the results to the region server 131A, the region server 131A may forward the results to the server 207A in the auxiliary services 122A, and the server 207A may forward the results to the user device 102 that requested execution of the task.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution environments 124 and/or 132 may provide the user devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution environments 124 and/or 132), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2A:
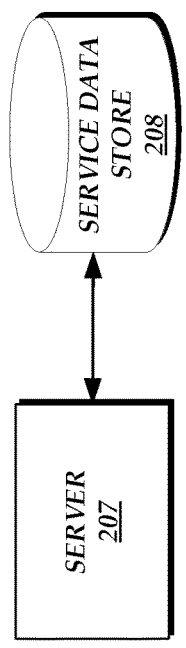
FIG. 2A illustrates an example block diagram of the auxiliary services 122 of FIG. 1, according to one embodiment.

FIG. 2A illustrates an example block diagram of the auxiliary services 122 of FIG. 1, according to one embodiment. As illustrated in FIG. 2A, the auxiliary services 122 can include a server 207 communicatively coupled to a service data store 208. The server 207 and service data store 208 may operate in conjunction to implement functionalities of the auxiliary services 122. For example, where the auxiliary services 122 is an edge server for a CDN, the server 207 and service data store 208 may operate to cache distributed content (e.g., as provided by a user of the auxiliary services 122) and respond to requests from end users for such cached content. As a further example, where the auxiliary services 122 is a database system, the server 207 and service data store 208 may operate to facilitate and manage interactions with a database. In general, auxiliary services 122 may include any network-based service or data source.

Auxiliary services 122 may be associated with operation of the on-demand code execution environment 124. For example, the server 207 may determine whether a requested task should be executed locally by the on-demand code execution environment 124 or remotely by a regional data center 130 in a manner as described above. If the server 207 determines that a regional data center 130 should receive the task for execution, the server 207 may further determine which regional data center 130 should receive the task in a manner as described above. In some instances, auxiliary services 122 actively transmit information, such as task requests (e.g., in the form of API calls) or other task-triggering information, to the on-demand code execution environment 124. In other instances, auxiliary services 122 may be passive, such that data is made available for access by the on-demand code execution environment 124. For example, components of the on-demand code execution environment 124 may periodically poll such passive data sources, and trigger execution of tasks within the on-demand code execution environment 124 based on the data provided (e.g., based on the availability of a task request received from a user device 102).

Operation of various auxiliary services 122, including CDN networks, database services, data storage services, and data processing services, are known within the art, and therefore will not be described herein. While a simplified view of auxiliary services 122 is shown in FIG. 2A (e.g., including a single server 207 and service data store 208), the POP 120 may implement auxiliary services 122 by use of any number of computing or storage devices, which may not be shown in FIG. 2A. In some instances, computing or storage devices associated with auxiliary services 122 may also be utilized to implement functionalities of the on-demand code execution environment 124. For example, virtual machine instances 250 of the on-demand code execution environment 124 (which are described in more detail below) may be implemented by the server 207. In some instances, the on-demand code execution environment 124 may execute tasks directly on the server 207 (e.g., without use of a virtual machine instance 250).

Figure 2B:
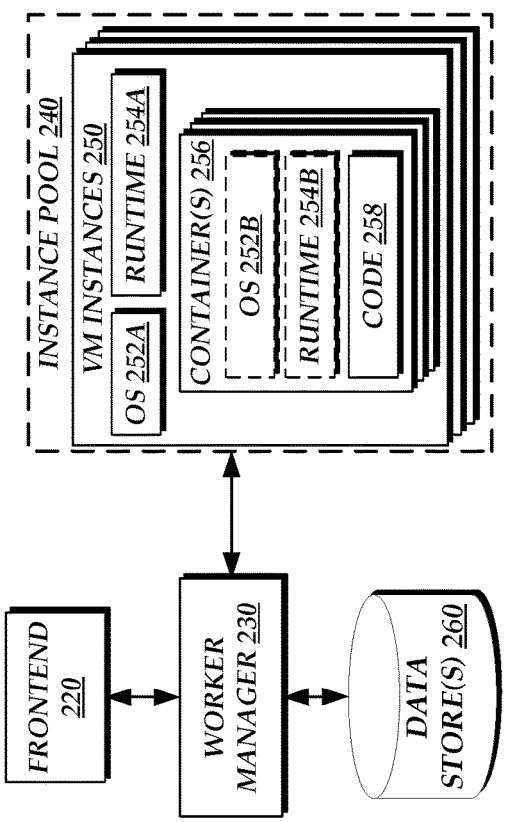
FIG. 2B illustrates an example block diagram of the on-demand code execution environments and of FIG. 1, according to one embodiment.

FIG. 2B illustrates an example block diagram of the on-demand code execution environments 124 and 132 of FIG. 1, according to one embodiment. As illustrated in FIG. 2A, the on-demand code execution environment 124 and the on-demand code execution environment 132 may each include the same components. However, the on-demand code execution environment 124 and the on-demand code execution environment 132 may receive data from different sources.

The on-demand code execution environments 124 and 132 include a frontend 220, worker manager 230, instance pool 240, and data stores 260 collectively configured to enable users (via user devices 102) or regional data centers 130 to submit computer executable instructions (also referred to herein as "code," "program code," or "user-defined code") to the on-demand code execution environment 124 or 132 for execution as a "task." For example, the data store 260 in the on-demand code execution environment 124 may store a copy of the code defined by a user. The code stored in the on-demand code execution environment 124 may be received from an on-demand code execution environment 132. The data store 260 in the on-demand code execution environment 132 may store a primary copy of the code defined by a user. The code stored in the on-demand code execution environment 132 may be received from a user device 102. Thus, the on-demand code execution environment 132 may store the primary, read-write version of the code, whereas the on-demand code execution environment 124 may store a secondary, read-only version of the code. An update to the code stored in the on-demand code execution environment 132 may be propagated (e.g., by the replication system 133) to other regional data centers 130 and/or POPs 120.

The frontend 220 can facilitate interactions between the on-demand code execution environment 124 and the user devices 102, auxiliary services 122, and/or other computing devices (not shown in FIG. 1 or 2B) via the network 110. Similarly, the frontend 220 can facilitate interactions between the on-demand code execution environment 132 and the region server 131, the user devices 102, and/or other computing devices (not shown in FIG. 1 or 2B) via the network 110. These interactions may include, for example, submission of code, which may be stored within the data stores 260, or transmission of requests to execute code, which may be communicated to the worker manager 230 for assignment to and execution by a virtual machine instance 250 within the instance pool 240. The frontend 220 may receive calls to execute tasks from the server 207 (if in the on-demand code execution environment 124) or the region server 131 (if in the on-demand code execution environment 132) in response to Hypertext Transfer Protocol Secure (HTTPS) requests (e.g., task requests) from a user. Also, any information (e.g., headers and parameters) included in the HTTPS request may also be processed and utilized when executing a task. Any other protocols, including, for example, HTTP, MQTT, and CoAP, may be used to transfer the message containing a task call to the frontend 220.

The on-demand code execution environments 124 and 132 are depicted in FIG. 2B as operating in a distributed computing environment including several computer systems that are interconnected using one or more computer networks (not shown in FIG. 1 or 2B). The on-demand code execution environments 124 and 132 could also operate within a computing environment having a fewer or greater number of devices than are illustrated in FIG. 1 or 2B. Thus, the depiction of the on-demand code execution environments 124 and 132 in FIGS. 1 and 2B should be taken as illustrative and not limiting to the present disclosure. For example, the on-demand code execution environments 124 and 132 or various constituents thereof could implement various Web services components, hosted or "cloud" computing environments, and/or peer to peer network configurations to implement at least a portion of the processes described herein. Further, the on-demand code execution environments 124 and 132 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more POPs 120 or regional data centers 130.

The frontend 220 can distribute a request to execute a task to a worker manager 230, which can assign tasks to virtual machine instances 250 for execution. In the example illustrated in FIG. 2B, the worker manager 230 manages the instance pool 240, which is a group (sometimes referred to as a pool) of virtual machine instances 250 that are utilized to execute tasks. As shown in FIG. 2B, instances 250 may have operating systems (OS) 252, language runtimes 254, and containers 256. Containers 256 are logical units created within a computing device using the resources available on that device, and may be utilized to isolate execution of a task from other processes (e.g., task executions) occurring on the device. For example, in order to service a request to execute a task, the worker manager 230 may, based on information specified in the request, create a new container 256 within a virtual machine instance 250 within which to execute the task. In other instances, the worker manager 230 may locate an existing container 256 in one of the instances 250 in the instance pool 240 and assign the container 250 to handle the execution of the task. Containers 256 may be implemented, for example, as Linux containers. The containers 256 may have individual copies of the OSes 252, the runtimes 254, and user-defined code 258 corresponding to various tasks assigned to be executed within the container 256.

While the instance pool 240 is shown in FIG. 2B as a single grouping of virtual machine instances 250, some embodiments of the present application may separate virtual machine instances 250 that are actively assigned to execute tasks from those virtual machine instances 250 that are not actively assigned to execute tasks. For example, those virtual machine instances 250 actively assigned to execute tasks may be grouped into an "active pool," while those virtual machine instances 250 not actively assigned to execute tasks may be placed within a "warming pool." Those virtual machine instances 250 within the warming pool may be pre-initialized with an operating system, language runtimes, or other software required to enable rapid execution of tasks in response to user requests. Further details regarding active pools and warming pools are described in greater detail within the '648 application, which is incorporated by reference above (e.g., at FIG. 1 of the '648 application).

On receiving a request to execute a task, the worker manager 230 may locate a virtual machine instance 250 within the instance pool 240 that has available capacity to execute the task. The worker manager 230 may further create a container 256 within the virtual machine instance 250, and provision the container 256 with any software required to execute the task (e.g., an operating system 252, runtime 254, or code 258). For example, a container 256 is shown in FIG. 2B provisioned with operating system 252B, runtime 254B, and a set of code 258. The operating system 252B and runtime 254B may be the same as the operating system 252A and runtime 254A utilized by the virtual machine instance 250, or may be different. After provisioning the container 256 with the requisite software for a task, the worker manager 230 can cause the virtual machine instance 256 to execute the task on behalf of a user.

The worker manager 230 includes a processing unit, a network interface, a computer readable medium drive, and an input/output device interface, all of which may communicate with one another by way of a communication bus. The network interface may provide connectivity to one or more networks or computing systems. The processing unit may thus receive information and instructions from other computing systems or services via the network 110. The processing unit may also communicate to and from a memory of the worker manager 230 and further provide output information for an optional display via the input/output device interface. The input/output device interface may also accept input from an optional input device. The memory may contain computer program instructions (grouped as modules in some embodiments) that the processing unit executes in order to implement one or more aspects of the present disclosure.

Additional details of the components and functionality of the auxiliary services 122 and the on-demand code execution environments 124 and 132 are described in greater detail in the '859 application, which is incorporated by reference above.

Example Block Diagrams for Executing a Task

Figure 3A:
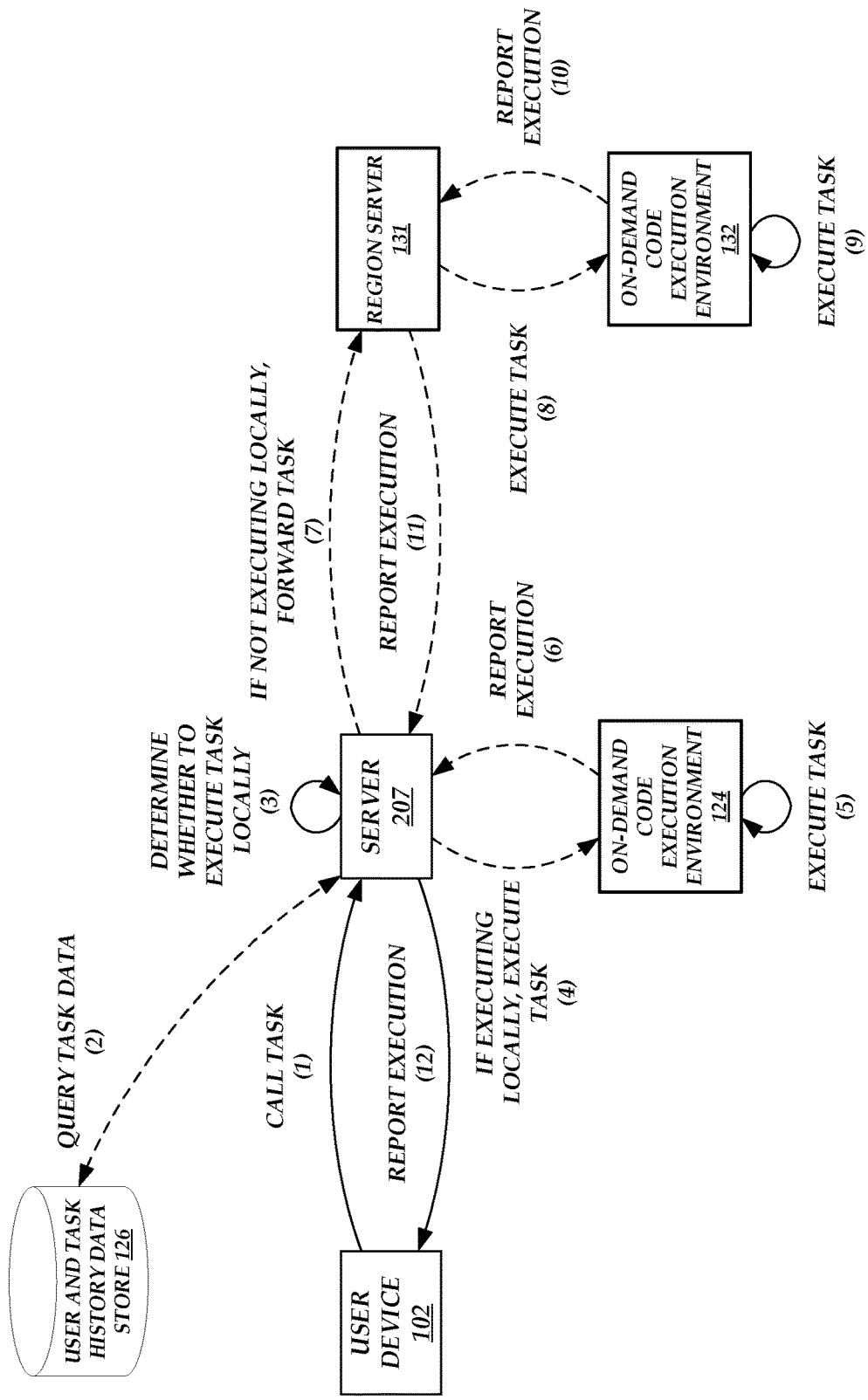
FIG. 3A is a block diagram of the operating environment of FIG. 1 illustrating the operations performed by the components of the operating environment to execute a task, according to one embodiment.

FIG. 3A is a block diagram of the operating environment 100 of FIG. 1 illustrating the operations performed by the components of the operating environment 100 to execute a task, according to one embodiment. As illustrated in FIG. 3A, the user device 102 calls a task by transmitting a request to execute the task to the server 207 at (1). The server 207 may query the user and task history data store 126 for task data at (2). The task data may include the popularity of the requested task, the historical volume of requests received from the user device 102 that requested the task execution, the latency-sensitivity of the task, properties of the task, and/or the like. The server 207 may then use the task data, and information identifying how busy the POP 120 is, a time it may take to execute the task locally at the POP 120, a time it may take to execute the task within a regional data center 130, the time of day that the request is received, and/or the like to determine whether to execute the task locally at (3). For example, the server 207 may determine whether sufficient computing resources are available to execute the task locally (and may determine to execute the task locally if the POP 120 has sufficient computing resources available). As another example, the server 207 may determine whether requests to execute the task are commonly received (and may determine to execute the task locally if requests to execute the task are common). If the server 207 determines to execute the task locally, then the server 207 may instruct the on-demand code execution environment 124 to execute the task at (4). Otherwise, if the server 207 determines not to execute the task locally, the server 207 may forward the task to the region server 131 at (7).

As described above, the server 207 may forward the task to the region server 131 even if the POP 120 has sufficient computing resource capacity to execute the task. For example, the server 207 may use information stored in the user and task history data store 126 as well as information identifying how busy the POP 120 is, a time it may take to execute the task locally at the POP 120, a time it may take to execute the task within a regional data center 130, the time of day that the request is received, and/or the like to determine whether to execute the task locally or to forward the task to the region server 131.

If the server 207 instructs the on-demand code execution environment 124 to execute the task, then the on-demand code execution environment 124 executes the task at (5). After execution, the on-demand code execution environment 124 reports results of the execution to the server 207 at (6).

If the server 207 forwards the task to the region server 131, the region server 131 then instructs the on-demand code execution environment 132 to execute the task at (8). In response to the instruction, the on-demand code execution environment 132 executes the task at (9) and reports results of the execution to the region server 131 at (10). The region server 131 then reports the execution results to the server 207 at (11).

Once the server 207 receives the execution results (either from the on-demand code execution environment 124 or from the region server 131), then the server 207 reports the execution results to the user device 102 at (12). Thus, the task may be successfully executed regardless of whether the POP 120 in which the server 207 is present has sufficient computing resource capacity to execute the task.

Figure 3B:
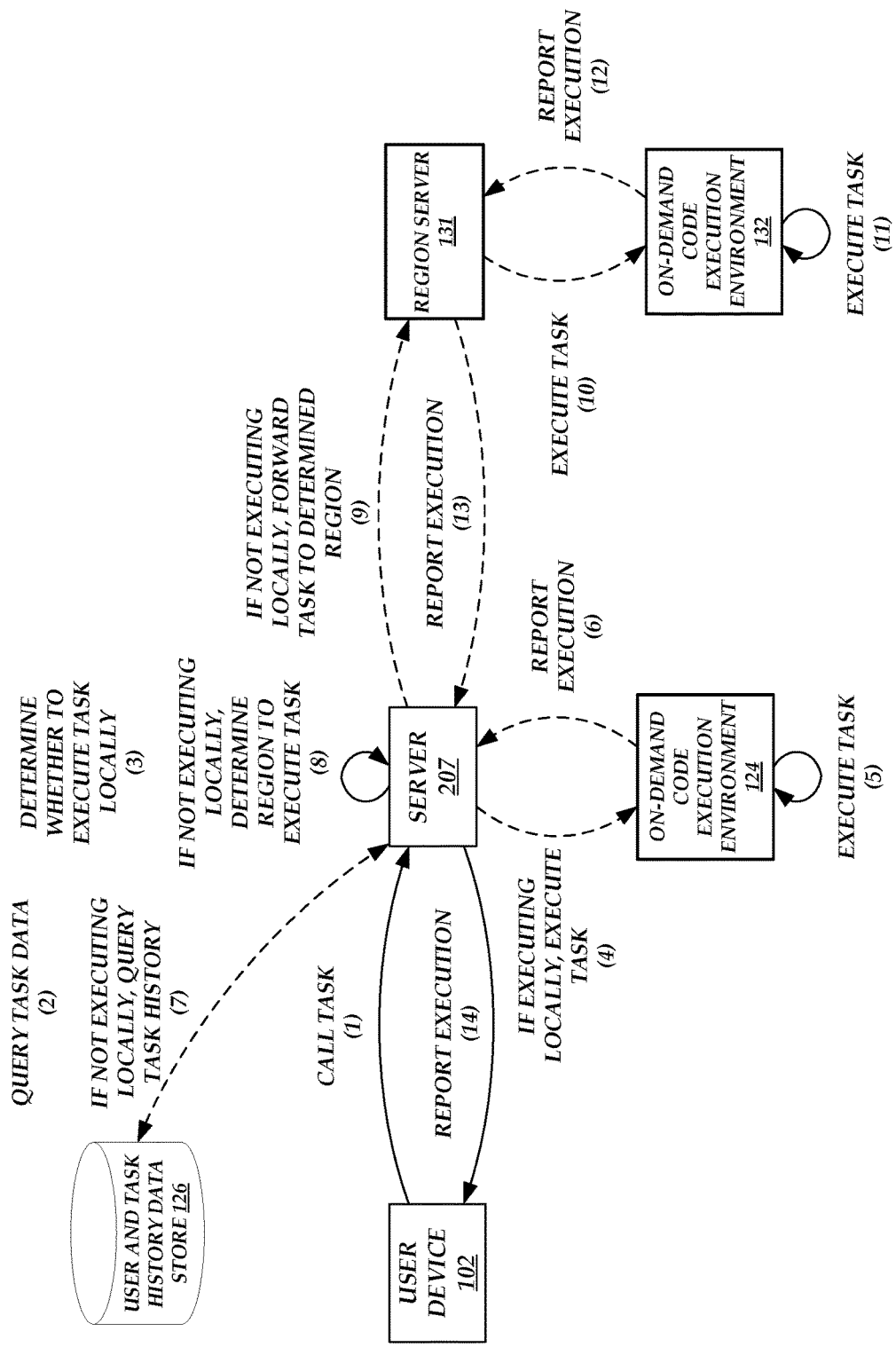
FIG. 3B is another block diagram of the operating environment of FIG. 1 illustrating the operations performed by the components of the operating environment to execute a task, according to one embodiment.

FIG. 3B is another block diagram of the operating environment 100 of FIG. 1 illustrating the operations performed by the components of the operating environment 100 to execute a task, according to one embodiment. As illustrated in FIG. 3B, the user device 102 calls a task by transmitting a request to execute the task to the server 207 at (1). The server 207 may query the user and task history data store 126 for task data at (2). The task data may include the popularity of the requested task, the historical volume of requests received from the user device 102 that requested the task execution, the latency-sensitivity of the task, properties of the task, and/or the like. The server 207 may then use the task data, and information identifying how busy the POP 120 is, a time it may take to execute the task locally at the POP 120, a time it may take to execute the task within a regional data center 130, the time of day that the request is received, and/or the like to determine whether to execute the task locally at (3). For example, the server 207 may determine whether sufficient computing resources are available to execute the task locally (and may determine to execute the task locally if the POP 120 has sufficient computing resources available). As another example, the server 207 may determine whether requests to execute the task are commonly received (and may determine to execute the task locally if requests to execute the task are common). If the server 207 determines to execute the task locally, then the server 207 may instruct the on-demand code execution environment 124 to execute the task at (4). Otherwise, if the server 207 determines not to execute the task locally, the server 207 may select a region server 131 in a particular geographic region to execute the task.

As described above, the server 207 may forward the task to a region server 131 even if the POP 120 has sufficient computing resource capacity to execute the task. For example, the server 207 may use information stored in the user and task history data store 126 as well as information identifying how busy the POP 120 is, a time it may take to execute the task locally at the POP 120, a time it may take to execute the task within a regional data center 130, the time of day that the request is received, and/or the like to determine whether to execute the task locally or whether to make a determination as to which region server 131 should receive a forwarded task.

If the server 207 instructs the on-demand code execution environment 124 to execute the task, then the on-demand code execution environment 124 executes the task at (5). After execution, the on-demand code execution environment 124 reports results of the execution to the server 207 at (6).

If the server 207 does not decide to instruct the on-demand code execution environment 124 to execute the task, then the server 207 may query the task history from the user and task history data store 126 at (7). As described herein, the task history may include information identifying which regional data centers 130 have previously received requests to execute the task and/or have provisioned virtual machine instances to execute the task. In an embodiment, the server 207 further queries the user and task history data store 126 to identify which regional data centers 130 have stored a current version of the user-defined code used to execute the task. Using some or all of this information, the server 207 selects a geographic region to execute the task at (8).

Once a geographic region is selected, the server 207 forwards the task to the region server 131 in the selected geographic region at (9). The region server 131 then instructs the on-demand code execution environment 132 to execute the task at (10). In response to the instruction, the on-demand code execution environment 132 executes the task at (11) and reports results of the execution to the region server 131 at (12). The region server 131 then reports the execution results to the server 207 at (13).

Once the server 207 receives the execution results (either from the on-demand code execution environment 124 or from the region server 131), then the server 207 reports the execution results to the user device 102 at (14). Thus, if the POP 120 is unable to execute a task, the server 207 can use gathered metrics to identify a geographic region that can more efficiently execute the task.

Example Block Diagram for Replicating User-Defined Code to Other Regions

Figure 4:
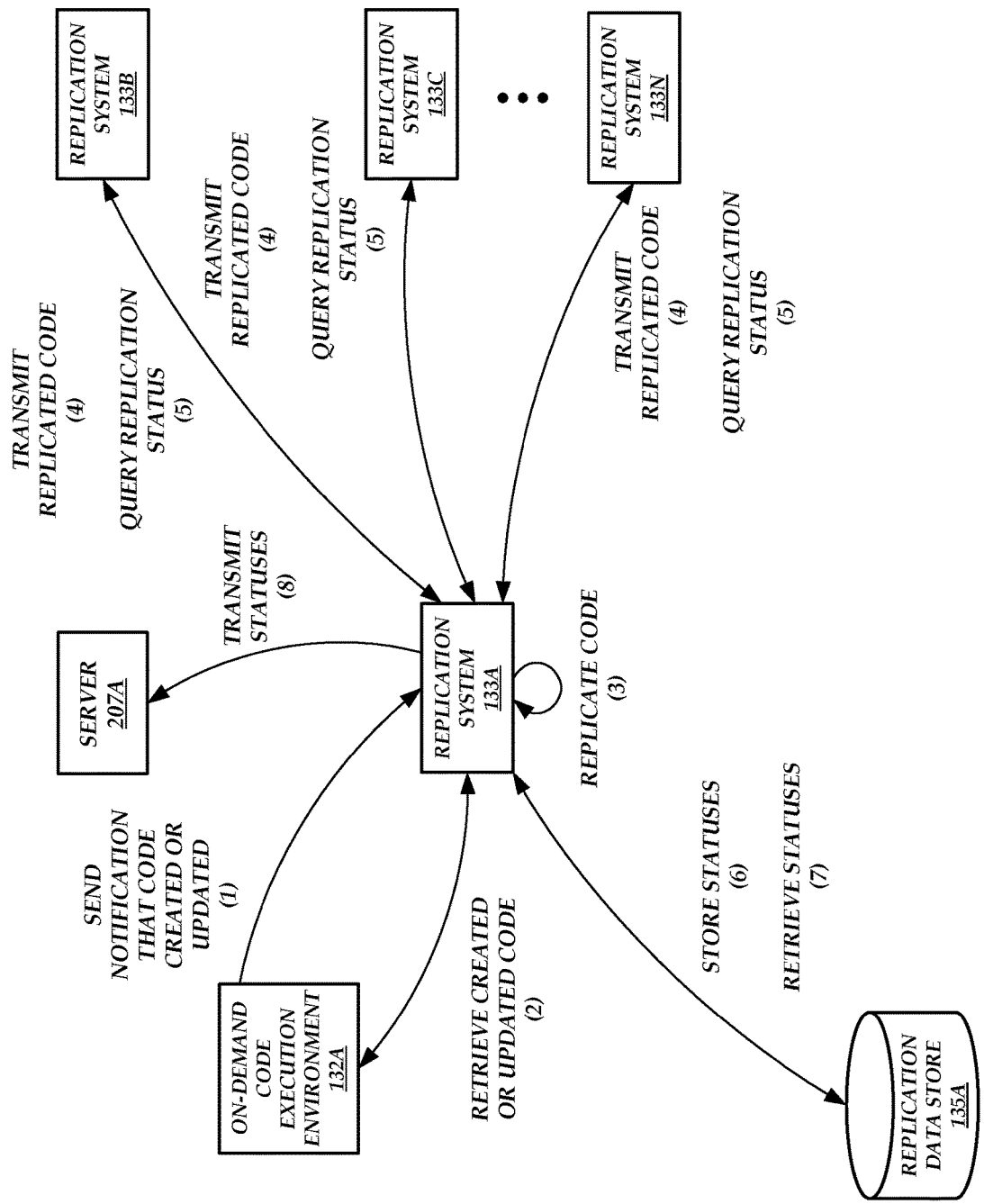
FIG. 4 is a block diagram of the operating environment of FIG. 1 illustrating the operations performed by the components of the operating environment to replicate user-defined code to one or more geographic regions, according to one embodiment.

FIG. 4 is a block diagram of the operating environment 100 of FIG. 1 illustrating the operations performed by the components of the operating environment 100 to replicate user-defined code to one or more geographic regions, according to one embodiment. As illustrated in FIG. 4, the on-demand code execution environment 132A sends a notification to the replication system 133A indicating that user-defined code is created or updated at (1). For example, the user-defined code may be stored in the data store 260A in the on-demand code execution environment 132A and may be associated with the geographic region in which the regional data center 130A is present. The on-demand code execution environment 132A may monitor for changes to user-defined code or for the creation of new user-defined code at the on-demand code execution environment 132A (e.g., the frontend 220A) may notify the replication system 133A when this occurs so that the replication system 133A can replicate the code to other geographic regions.

Upon receiving the notification, the replication system 133A can retrieve the created or updated user-defined code from the on-demand code execution environment 132A at (2). Once the user-defined code is retrieved, the replication system 133A can replicate the user-defined code at (3). For example, the replication system 133A may replicate the bits of the user-defined code.

After the user-defined code is replicated, the replication system 133A may begin transmitting the replicated user-defined code to one or more other replication systems 133B-N at (4). For example, the replication system 133A may transmit the replicated user-defined code to the other replication systems 133B-N in parallel, in sequence, in bursts or groups, and/or in any combination thereof.

In other embodiments, not shown, the replication system 133A can alternatively or in addition transmit the replicated user-defined code to one or more POPs 120A-N. The POPs 120A-N may receive the replicated user-defined code such that these entities do not have to retrieve the user-defined code from the geographic region in which the code is stored and/or so that the POPs 120A-N can forward the replicated user-defined code to the various regional data centers 130B-N.

Periodically, the replication system 133A may determine a status of the transmissions of the replicated user-defined code. For example, the replication system 133A can transmit a message to any number of the replication systems 133B-N requesting the replication status at (5). The replication status can include a version of the user-defined code currently stored in the regional data center 130B-N, whether the latest replication transmission is complete (and if not, the progress of the transmission), and/or whether the replication transmission has started. The replication system 133A may store the received statuses in the replication data store 135A at (6).

Synchronously with or asynchronously from the replication status queries, the replication system 133A can retrieve the statuses stored in the replication data store 135A at (7) and transmit the statuses to the server 207 at (8). The replication system 133A may forward the statuses to the server 207A to aid the server 207A in making a determination of which geographic region to select to receive a forwarded task.

Example Table in the Replication Data Store

FIG. 5 is an example table 510 stored in the replication data store 135 of FIG. 1, according to one embodiment. The table 510 may be associated with a specific version of user-defined code that is associated with a particular geographic region. Thus, if multiple versions of the same user-defined code exist in a particular geographic region, then the replication data store 135 may include a separate table 510 for each version of the user-defined code.

As illustrated in FIG. 5, the table 510 identifies a name of the user-defined code (e.g., function 515), a current version of the user-defined code (e.g., version 1.6), geographic regions that are authorized to execute the task corresponding to the user-defined code (e.g., geographic regions 520, 522, and 524), the replication status of the user-defined code stored in each of the authorized geographic regions, and a time that each geographic region was last fully synched with the geographic region of the function 515 (e.g., the last time that a particular geographic region received a complete replicated version of the function 515). For example, the status for the geographic region 520 indicates that the user-defined code is fully replicated with the last complete sync occurring at 12:45:32 on Mar. 23, 2016, the status for the geographic region 522 indicates that the replication is in progress and is 50% complete with the last complete sync occurring at 15:02:44 on Mar. 22, 2016, and the status for the geographic region 524 indicates that the replication has not started and the version of the user-defined code stored in the regional data center 130 in the geographic region 524 is version 1.5 with the last complete sync occurring at 22:10:31 on Mar. 19, 2016. The replication data store 135 may include additional tables, one for each user-defined code that is associated with the geographic region in which the replication data store 135 is present and/or one for each version of the user-defined code that is associated with the geographic region in which the replication data store 135 is present.

Example Task Execution Routines

Figure 6:
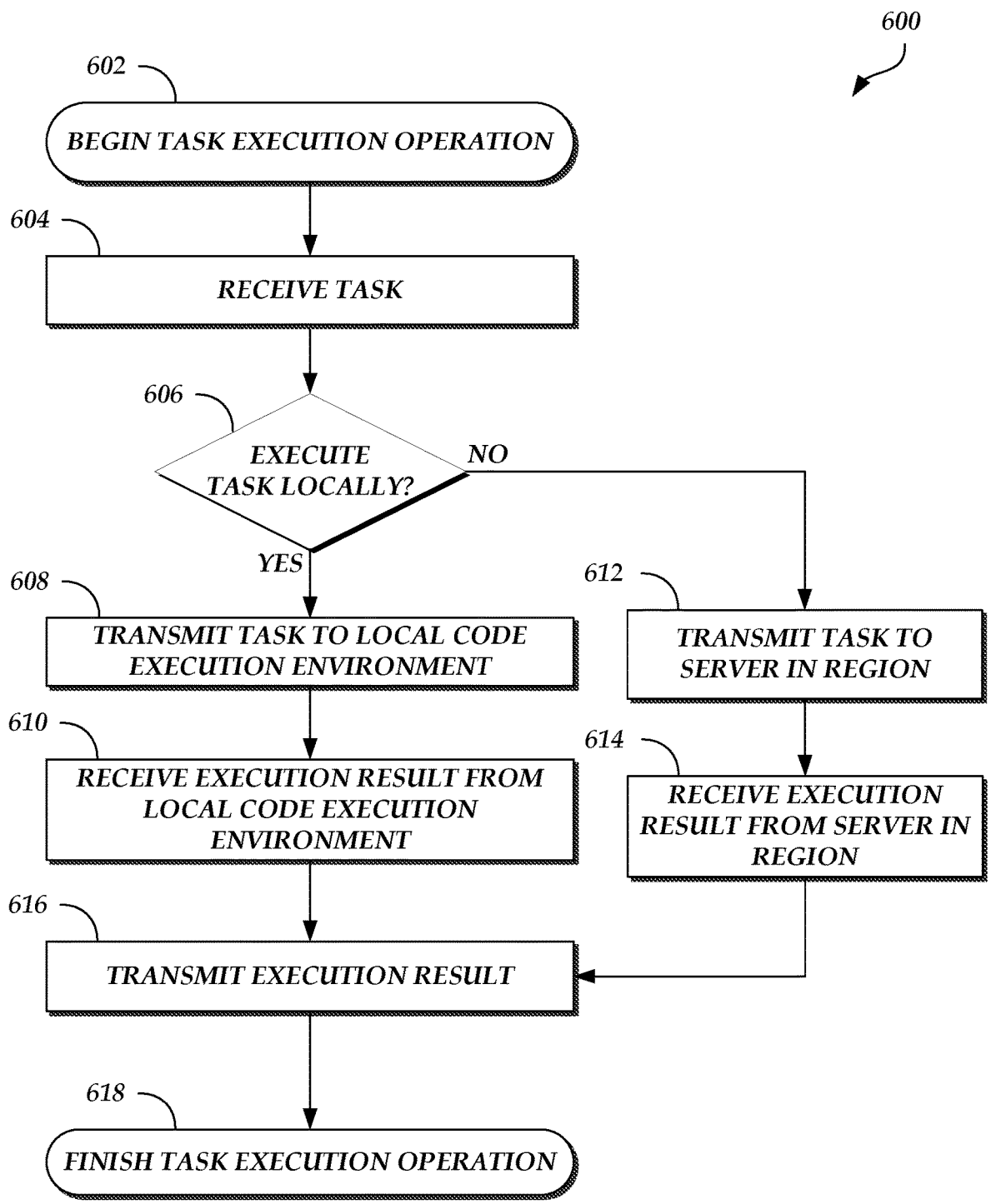
FIG. 6 is a flow diagram depicting a task execution routine illustratively implemented by a POP, according to one embodiment.

FIG. 6 is a flow diagram depicting a task execution routine 600 illustratively implemented by a POP, according to one embodiment. As an example, the POP 120 (e.g., the server 207) of FIGS. 1 and 2A-2B can be configured to execute the task execution routine 600. The task execution routine 600 begins at block 602.

At block 604, a task is received. For example, the task may be received from a user device 102. The task may be received for the purpose of executing the task.

At block 606, a determination is made as to whether the POP 120 will execute the task locally. For example, the POP 120 determines whether there is a sufficient amount of computing resources available to execute the task locally (and may determine to execute the task locally if the POP 120 has sufficient computing resources available). As another example, the POP 120 determines whether requests to execute the task are commonly received (and may determine to execute the task locally if requests to execute the task are common). If the POP 120 determines to execute the task locally, the task execution routine 600 proceeds to block 608. Otherwise, if the POP 120 determines not to execute the task locally, the task execution routine 600 proceeds to block 612.

At block 608, the task is transmitted to the local code execution environment. For example, the task is transmitted to the on-demand code execution environment 124. The local code execution environment may then use a virtual machine instance to execute the task.

At block 610, an execution result is received from the local code execution environment. The execution result may include content (e.g., media, audio content, video content, etc.), a confirmation that an action corresponding to the task has been performed (e.g., a change to a parameter, the authentication of credentials, etc.), a notification that execution failed, and/or the like.

At block 612, the task is transmitted to a server in a geographic region. For example, the POP 120 transmits the task to the region server 131 in the geographic region closest to the POP 120. The server in the geographic region then forwards the task to a code execution environment local to the geographic region for execution. The results of the execution are then forwarded from the code execution environment local to the geographic region to the server in the geographic region.

At block 614, an execution result is received from the server in the geographic region. Thus, the POP 120 may receive the execution result from the local code execution environment or from a server in a geographic region.

At block 616, the execution result is transmitted. For example, the execution result is transmitted to the user device 102 that initiated the task call. After the execution result is transmitted, the task execution routine 600 may be complete, as shown in block 618.

Figure 7:
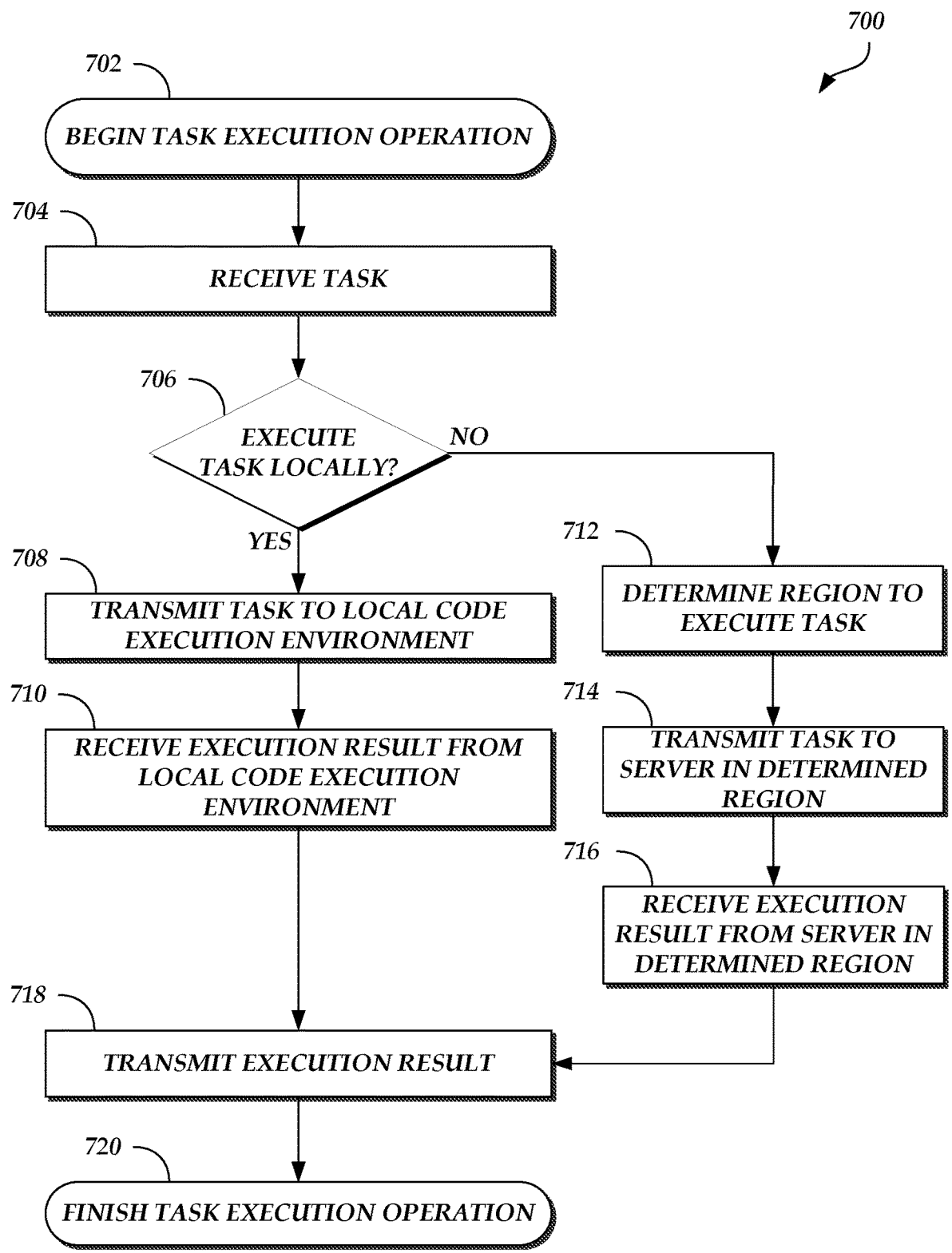
FIG. 7 is another flow diagram depicting a task execution routine illustratively implemented by a POP, according to one embodiment.

FIG. 7 is another flow diagram depicting a task execution routine 700 illustratively implemented by a POP, according to one embodiment. As an example, the POP 120 (e.g., the server 207) of FIGS. 1 and 2A-2B can be configured to execute the task execution routine 700. The task execution routine 700 begins at block 702.

At block 704, a task is received. For example, the task may be received from a user device 102. The task may be received for the purpose of executing the task.

At block 706, a determination is made as to whether the POP 120 will execute the task locally. For example, the POP 120 determines whether there is a sufficient amount of computing resources available to execute the task locally (and may determine to execute the task locally if the POP 120 has sufficient computing resources available). As another example, the POP 120 determines whether requests to execute the task are commonly received (and may determine to execute the task locally if requests to execute the task are common). If the POP 120 determines to execute the task locally, the task execution routine 700 proceeds to block 708. Otherwise, if the POP 120 determines not to execute the task locally, the task execution routine 700 proceeds to block 712.

At block 708, the task is transmitted to the local code execution environment. For example, the task is transmitted to the on-demand code execution environment 124. The local code execution environment may then use a virtual machine instance to execute the task.

At block 710, an execution result is received from the local code execution environment. The execution result may include content (e.g., media, audio content, video content, etc.), a confirmation that an action corresponding to the task has been performed (e.g., a change to a parameter, the authentication of credentials, etc.), a notification that execution failed, and/or the like.

At block 712, a geographic region to execute the task is determined. While the default geographic region to execute the task may be the geographic region that is closest to the POP 120, the closest geographic region may not always be the most efficient geographic region to handle the task. For example, the POP 120 may consider which regional data centers 130 are storing a current version of the user-defined code, which regional data centers 130 have previously received a request to execute the task, and/or which regional data centers 130 have provisioned a virtual machine instance to execute the task. The POP 120 can, for example, determine which regional data centers 130 have a current version of the user-defined code stored therein and then select one regional data center 130 from those that have the current version of the user-defined code to execute the task. The POP 120 may consider which of those regional data centers 130 has previously received a request to execute the task or has a virtual machine instance provisioned to execute the task in selecting the appropriate regional data center 130. In further embodiments, the closest or otherwise most-efficient regional data center 130 is not selected because that regional data center 130 does not have a virtual machine instance provisioned to execute the task or otherwise has never previously received a request to execute the task. In such a situation, the POP 120 may instruct the regional data center 130 to provision a virtual machine instance to execute the task so that this regional data center 130 can receive future task execution requests.

At block 714, the task is transmitted to a server in the determined geographic region. The server in the determined geographic region then forwards the task to a code execution environment local to the determined geographic region for execution. The results of the execution are then forwarded from the code execution environment local to the determined geographic region to the server in the determined geographic region.

At block 716, an execution result is received from the server in the determined geographic region. Thus, the POP 120 may receive the execution result from the local code execution environment or from a server in the determined geographic region.

At block 718, the execution result is transmitted. For example, the execution result is transmitted to the user device 102 that initiated the task call. After the execution result is transmitted, the task execution routine 700 may be complete, as shown in block 720.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   causing a first code execution environment located at a first geographic location to provision a virtual machine instance;
   receiving a request to execute code stored on a second code execution environment located at a second geographic location different than the first geographic location, wherein the second code execution environment comprises a computing device;
   determining that the code should be executed on the first code execution environment, wherein the first code execution environment comprises a replication of the code, and wherein the determination that the code should be executed on the first code execution environment is based at least in part on a determination that the first code execution environment has previously received a request to execute the code and the virtual machine instance has been provisioned to execute the replication of the code in the first geographic location of the first code execution environment;
   transmitting the request to execute the code to the first geographic location of the first code execution environment; and
   receiving results of the execution of the replication of the code by the first code execution environment.

2. The computer-implemented method of claim 1, wherein the computing device is at least one of a second virtual machine instance or a physical computing device.

3. The computer-implemented method of claim 1, wherein the first code execution environment comprises the virtual machine instance.

4. The computer-implemented method of claim 1, wherein determining that the code should be executed on the first code execution environment further comprises determining that the code should be executed on the first code execution environment based at least in part on how often the computing device is requested to execute the code, a duration of time to execute the code by the second code execution environment, a duration of time to execute the replication of the code by the first code execution environment, a time of day that the request to execute the code is received, a latency-sensitivity of the code, or properties of the code.

5. The computer-implemented method of claim 1, wherein transmitting the request to execute the code further comprises transmitting the request to execute the code via a second computing device located at the first geographic location of the first code execution environment.

6. The computer-implemented method of claim 1, further comprising:
   receiving a second request to execute second code on the second code execution environment;
   determining that the second code should be executed on the second code execution environment;
   transmitting the second request to execute the second code to the second code execution environment; and
   receiving second results of execution of the second code by the second code execution environment.

7. The computer-implemented method of claim 6, wherein determining that the second code should be executed on the second code execution environment further comprises determining that the second code should be executed on the second code execution environment based on an availability of computing resources of the computing device.

8. A system comprising:
   a first code execution environment that comprises a first computing device and that is located at a first geographic location; and a second computing device comprising a processor in communication with the first code execution environment and configured with specific computer-executable instructions to:
  cause a second code execution environment located at a second geographic location different than the first geographic location to provision a virtual machine instance;
  receive a request to execute code;
  determine that the code should be executed on the second code execution environment, wherein the second code execution environment comprises a replication of the code, and wherein the determination that the code should be executed on the second code execution environment is based at least in part on a determination that the virtual machine instance has been provisioned to execute the replication of the code in the second geographic location of the second code execution environment;
  transmit the request to execute the code to the second geographic location of the second execution environment; and
  receive results of execution of the replication of the code by the second code execution environment.

9. The system of claim 8, wherein the first computing device is at least one of a second virtual machine instance or a physical computing device.

10. The system of claim 8, wherein the second code execution environment comprises the virtual machine instance.

11. The system of claim 8, wherein the second computing device is further configured with specific computer-executable instructions to determine that the code should be executed on the second code execution environment based at least in part on at least one of how often the system is requested to execute the code, a duration of time to execute the code by the first code execution environment, a duration of time to execute the replication of the code by the second code execution environment, a time of day that the request to execute the code is received, a latency-sensitivity of the code, or properties of the code.

12. The system of claim 8, wherein the second computing device is further configured with specific computer-executable instructions to transmit the request to execute the code to the second code execution environment via a third computing device located at the second geographic location of the second code execution environment.

13. The system of claim 8, wherein the second computing device is further configured with specific computer-executable instructions to:
  receive a second request to execute second code on the first code execution environment;
  determine that the second code should be executed on the first code execution environment;
  transmit the second request to execute the second code to the first code execution environment; and
  receive second results of execution of the second code by the first code execution environment.

14. The system of claim 13, wherein the second computing device is further configured with specific computer-executable instructions to determine that the second code should be executed on the first code execution environment based on an availability of computing resources of the system to execute the second code.

15. Non-transitory, computer-readable storage media comprising computer-executable instructions for selecting a location at which to execute code, wherein the computer-executable instructions, when executed by a computer system, cause the computer system to:
  cause a first code execution environment located at a first geographic location to provision a virtual machine instance;
  receive a request to execute code on a second code execution environment located at a second geographic location different than the first geographic location;
  determine that the code should be executed on the first code execution environment, wherein the first code execution environment comprises a replication of the code, and wherein the determination that the code should be executed on the first code execution environment is based at least in part on a determination that the virtual machine instance has been provisioned to execute the replication of the code in the first geographic location of the first code execution environment;
  transmit the request to execute the code to the geographic location of the first code execution environment; and
  receive results of execution of the replication of the code by the first code execution environment.

16. The non-transitory, computer-readable storage media of claim 15, wherein the computer-executable instructions further cause the computer system to transmit the results to a user device.

17. The non-transitory, computer-readable storage media of claim 15, wherein the first code execution environment comprises the virtual machine instance.

18. The non-transitory, computer-readable storage media of claim 15, wherein the computer-executable instructions further cause the computer system to determine that the code should be executed on the first code execution environment based on at least one of how often the computer system is requested to execute the code, a duration of time to execute the code by the second code execution environment, a duration of time to execute the replication of the code by the first code execution environment, a time of day that the request to execute the code is received, a latency-sensitivity of the code, or properties of the code.

19. The non-transitory, computer-readable storage media of claim 15, wherein the computer-executable instructions further cause the computer system to:
  receive a second request to execute second code on the second code execution environment;
  determine that the second code should be executed on the second code execution environment;
  transmit the second request to execute the second code to the second code execution environment; and
  receive second results of execution of the second code by the second code execution environment.

20. The non-transitory, computer-readable storage media of claim 15, wherein the computer-executable instructions further cause the computer system to determine that the second code should be executed on the second code execution environment based on an availability of computing resources of the computer system to execute the second code.

* * * * *